(12) United States Patent
Barros et al.

(10) Patent No.: US 10,433,185 B2
(45) Date of Patent: Oct. 1, 2019

(54) TERAHERTZ COMMUNICATION METHOD AND SYSTEM

(71) Applicant: Waterford Institute of Technology, Waterford (IE)

(72) Inventors: Michael Barros, Campina Grande (BR); Sasitharan Balasubramaniam, Waterford (IE); Robert Mullins, Clonmel (IE)

(73) Assignee: Waterford Institute of Technology, Waterford (IE)

( * ) Notice: Subject to any disclaimer, the term of this patent is extended or adjusted under 35 U.S.C. 154(b) by 0 days.

(21) Appl. No.: 15/837,464

(22) Filed: Dec. 11, 2017

(65) Prior Publication Data

US 2018/0176797 A1    Jun. 21, 2018

(30) Foreign Application Priority Data

Dec. 19, 2016 (GB) .................. 1621652.5

(51) Int. Cl.
| | | |
|---|---|---|
| *H04W 16/28* | (2009.01) | |
| *H01Q 19/10* | (2006.01) | |
| *H04W 24/08* | (2009.01) | |
| *H04W 64/00* | (2009.01) | |
| *H01Q 1/12* | (2006.01) | |
| *H01Q 3/04* | (2006.01) | |
| *H04B 17/391* | (2015.01) | |

(52) U.S. Cl.
CPC .......... *H04W 16/28* (2013.01); *H01Q 1/1264* (2013.01); *H01Q 3/04* (2013.01); *H01Q 19/10* (2013.01); *H04W 64/006* (2013.01); *H04B 17/391* (2015.01); *H04W 24/08* (2013.01)

(58) Field of Classification Search
CPC ....... H04W 16/28; H04W 24/02; H01Q 15/14
See application file for complete search history.

(56) References Cited

U.S. PATENT DOCUMENTS

| | | | | |
|---|---|---|---|---|
| 10,090,606 | B2* | 10/2018 | Henry | .................. H01Q 9/0485 |
| 2012/0099856 | A1* | 4/2012 | Britz | ..................... H04B 10/90 |
| | | | | 398/26 |
| 2015/0351112 | A1 | 12/2015 | Britz et al. | |
| 2017/0310006 | A1* | 10/2017 | Vidal Drummond | ....................... |
| | | | | H01Q 3/2676 |

OTHER PUBLICATIONS

Barros, Michael T.; "Integrated Terahertz Communication with Reflectors for 5G Small Cell Networks"; IEEE Transaction on Vehicular Technology; Copyright 2016 IEEE; pp. 12.

* cited by examiner

*Primary Examiner* — Joshua L Schwartz
(74) *Attorney, Agent, or Firm* — Hoffman Warnick LLC

(57) ABSTRACT

The present disclosure teaches an antenna structure comprising an antenna transmitting a signal in the terahertz band and at least one mirror, which is moveable to reflect a terahertz-band signal from a neighboring antenna. There may be a communication cell comprising a plurality of such antenna structures. The communication cell may define a coverage area. In another embodiment, the present disclosure teaches a method for controlling the antenna structures to improve the performance of the communication cell.

14 Claims, 14 Drawing Sheets
(9 of 14 Drawing Sheet(s) Filed in Color)

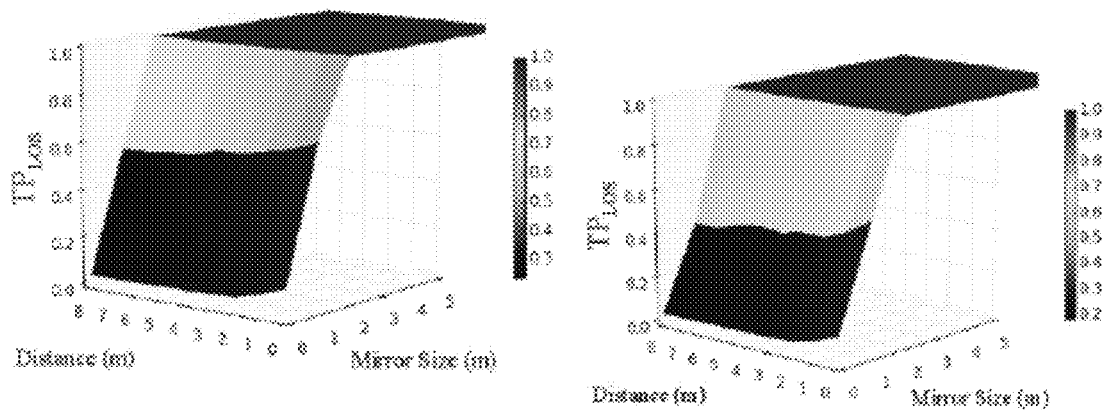
FIG 8c
FIG 8d
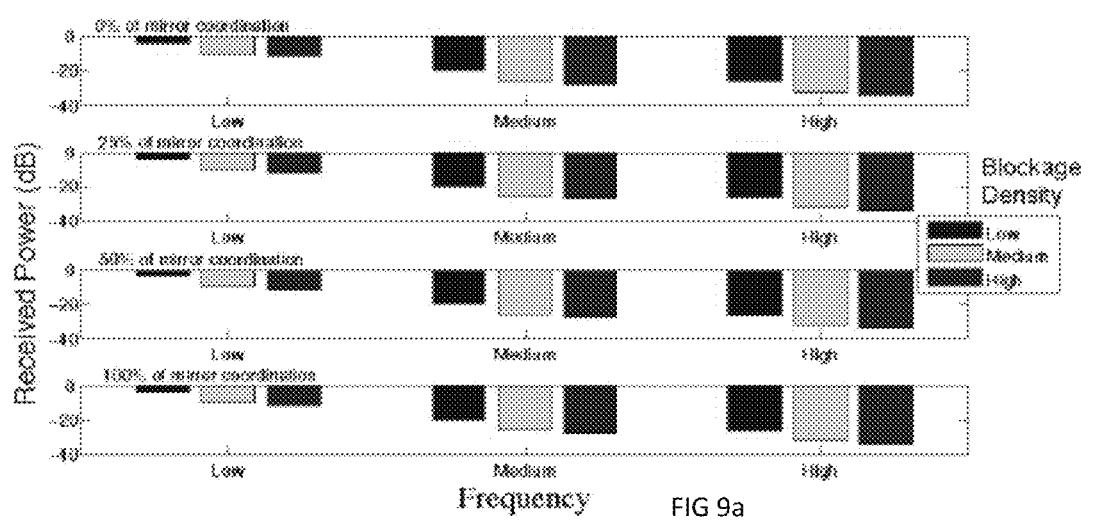
FIG 9a
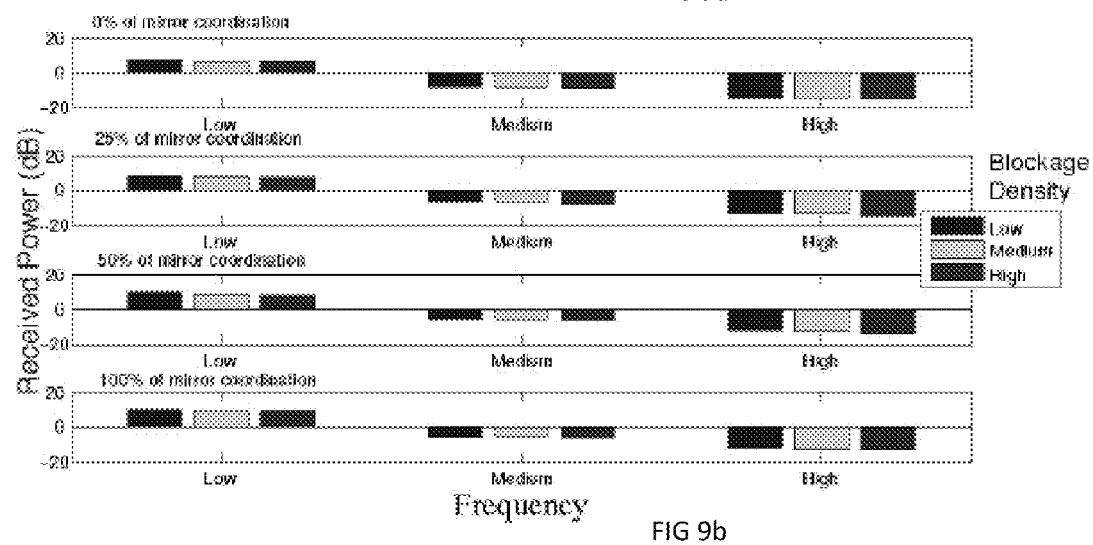
FIG 9b 350
312c
312a
312b

320

TERAHERTZ COMMUNICATION METHOD AND SYSTEM

TECHNICAL FIELD

The present disclosure relates to a communication method and system, particularly using terahertz (THz) band communication in a small cell network.

BACKGROUND

The evolutionary development of mobile networks has resulted in advanced technologies for both the handset as well as wireless access to the base stations. This development has provided users with unprecedented data rates enabling various types of rich multimedia services to be realised (e.g. high definition video conferencing). By 2020, the IP data handled by wireless networks is expected to exceed 500 exabytes. The expectations of 5G systems are planned towards high capacity communication links (10 Gbps) that can provide users access to numerous types of application (e.g. augmented reality, holographic multimedia streaming) Other requirements of these next-generation networks, include end-user Quality of Service (QoS), energy efficiency, green communication systems and flexible management of resources. Maintaining a high QoS over infrastructure that supports mobility of users (or groups of users) migrating between locations requires frequent handovers for roaming. The network management of 5G networks is moving towards decoupling the data and control plane through Software-Defined Networking (SDN) as well as Network Function Virtualization (NFV).

While new forms of software development are being planned for 5G systems, there is also a need to discover new wireless technologies between the handset and the base stations that are able to handle very high speed transmission. One approach that is being investigated is to push the carrier frequencies into the terahertz (THz) band. The THz band is the spectral band that spans the frequencies between 0.1 THz and 10 THz.

Terahertz band communication has many challenges including the need for Line-of-Sight (LoS) links, the loss of signal strength due to molecular absorption depending on weather conditions and issues with the frequency response due to the Doppler Effect. Typically, when signals are transmitted in the terahertz band, the data rate drops considerably for non-line of sight connections (NLoS) due to reflection and/or scattering losses on rough surfaces. Multipath propagations and the Doppler Effect are also known to present problem for outdoor Terahertz band communication systems and are considered highly challenging to system performance.

Some work has been done on systems for terahertz band communication. For example, U.S. Pat. No. 9,397,758 to Georgia Tech Research Corporation et al proposes a graphene-based plasmonic nano-transceiver for terahertz communication. US2016/218464 also to Georgia Tech Research Corporation proposes a graphene-based plasmonic nano-antenna for terahertz communication. A paper entitled "Three-dimensional End-to-End Modelling and Analysis for Graphene-Enabled Terahertz Band Communications" by Chong Han and Ian Akyildiz published in IEEE Transactions on Vehicular Technology, Special Section on THz Communication for Vehicular Networks (DOI: 10.1109/TVT.2016.2614335), 2017 investigates a graphene-based reflectarray antenna.

SUMMARY

In one embodiment, the present disclosure teaches an antenna structure comprising an antenna transmitting a signal in the terahertz band and at least one mirror, which is moveable to reflect a terahertz-band signal from a neighbouring antenna. In another embodiment, the present disclosure teaches a communication cell comprising a plurality of such antenna structures. The communication cell may define a coverage area. In another embodiment, the present disclosure teaches a method for controlling the antenna structures to improve the performance of the communication cell.

The mirror is not reflecting the signal from the antenna within the antenna structure but a different signal from a neighbouring antenna. The neighbouring antenna may be adjacent the antenna structure or the neighbouring antenna may not be the closest antenna to the antenna structure but merely nearby. For example, the neighbouring antenna may be a short distance away, e.g. between 1 to 10 m away. As explained in more detail below, the antenna structure and its neighbouring antenna may form part of a communication cell to provide a signal within a coverage area.

Within the coverage area, whether indoor or outdoor, there are typically objects which block the signal. Accordingly, there may be no line of sight between the transmitter and a target within the coverage area. Loss of line of sight is particularly problematic for terahertz communication due to scattering and absorption loss to reflected rays on walls. By reflecting the terahertz-band signal from a neighbouring antenna, the antenna structure may provide a virtual line of sight from the neighbouring antenna to a target within the coverage area.

The at least one mirror may be moveable by being rotatable. The antenna structure may further comprise a motor to rotate the mirror. The motor may be controllable to change the angle of the mirror relative to neighbouring antenna. The motor may have a TCP/IP interface that enables telemetric functions interpretation. This may be used to connect the motor and hence the mirrors to a controller (which may also be termed a network management component or autonomous management component) to enable autonomous mirror rotation. The controller can therefore control the mirror directly while processing data from the network. Captured data may be used as an input for machine learning as described below. The output of the machine learning may be connected to a set of policies that will include where to the mirrors should rotate.

The antenna structure may comprise a camera. When the antenna structure is in an offline mode, the camera may be capable of processing the position of the target user (and their mobile phone) and determining a predicted geolocation which may be input to the controller, e.g. to the machine learning component. Performance of this method is determined by the type of camera, efficiency of real-time video processing and accuracy of predicting the mobile phone geolocation.

Alternatively, or additionally, the at least one mirror may be a variable radius mirror and the at least one mirror is moveable by changing the curvature of the at least one mirror, e.g. by using variable liquid pressure. An example of such a variable radius mirror is sold as II-VI variable mirror sold by II-VI Infrared, for example as described in www.i-viinfrared.com/pdfs/II-VI_vrm_2009-05.pdf. It will be appreciated that a planar mirror is a special state of the variable curvature mirror where it is in neither convex nor concave mode. It may be possible to adjust the radius of a mirror more quickly that rotating the mirror and thus may be more practicable than a flat moveable mirror. For example, varying the radius may allow a desired focus and dispersion of light to be achieved. Nevertheless, both mechanisms may be used separately or in combination to move the at least one mirror.

The at least one mirror may be a dielectric mirror and may comprise a plurality of layers of dielectric material, for example silicon. The at least one mirror may comprise a coating which is selected so that the at least one mirror reflects a specific wavelength within the terahertz-band. The specific wavelength is ideally the one which is being transmitted. The THz band is the spectral band that spans the frequencies between 0.1 THz and 10 THz. The antenna may transmits a signal between 0.1 to 10 THz, more preferably between 0.3 to 4 THz, more particularly at around 0.3 THz. Accordingly, the coating may reflect 0.3 THz. This technique is also applicable to the millimeter-wave frequency band from 100-300 GHz.

The antenna may be a patch antenna. The antenna may comprise an antenna array with N nodes. The antenna may be configured to use beamforming to direct the terahertz-band signal towards the at least one mirror of a neighbouring antenna. Beamforming is a known technique which allows an antenna to provide a directional signal without moving the transmitter. The antenna may also be configured to use beamsteering to direct the terahertz-band signal from a central node (also known as central lobe) of the antenna towards the at least one mirror of a neighbouring antenna. The antenna may also be configured to control a beamwidth of the terahertz-band signal.

The antenna structure may comprise a pair of and/or a plurality of mirrors. The antenna may be mounted centrally between the pair of mirrors, e.g. with a mirror above and below the antenna. Each mirror in the pair of or the plurality of mirrors may be moveable independent of the other mirror or they may be moveable as a pair. The mirrors may form an array around the centrally mounted antenna. The mirrors may have the same or different sizes.

The or each mirror may have a size which is proportional to a coverage area for the terahertz-band signal. For example, the mirror may have a width of between 0.5 m and 5 m, preferably between 1 m and 2 m. Such sizes are in proportion for coverage areas of between 5 to 20 m by 5 to 20 m. The or each mirror may have a size which is proportional to power of the terahertz-band signal. For example, in an outdoor environment, the signal is likely to be more powerful than in an indoor environment. Accordingly, the mirrors may be larger in an outdoor environment than in an indoor environment.

As set out above, the antenna structure and its neighbouring antenna may form part of a communication cell.

In general, the nature of the proposed disclosure is most suitable to providing a high degree of coverage in specific areas such as large urban areas with a high concentration of users such as a city centre, or major thoroughfares, rather than a blanket coverage of large rural areas, as would be more typical of current cellular technologies. The coverage area is preferably small, for example the coverage area is between 5 m to 20 m by 5 m to 20 m. A coverage area of 5 m by 5 m may be sufficient for an indoor environment and a coverage are of 20 m by 20 m may be more typical for an outdoor environment.

The antenna structures may be spaced along at least two edges of the coverage area, for example along two opposing edges. The antenna structures may be equally (i.e. uniformly) spaced from one another or may be spaced to fit the coverage area, for example to be attached to objects within the coverage area. The number of antennas may be directly related to the size of the area that is intended to be covered, for example, a 20×20 $m^2$ area will have 4-6 mirrors, two or three antenna structures on opposed edges of the coverage area.

The mirrors may be individually controlled to set a desired angle of reflection from each mirror to target a specific location within the coverage area so that the mirrors are coordinated. The co-ordination could be expressed as the percentage of the total number of mirrors that are synchronised to reflect to the specific location. At least 25%, more preferably 50% of the mirrors of the plurality of the antenna structures may be co-ordinated so that each of the mirrors reflects the terahertz-band signal to the specific location within the coverage area.

The present disclosure also describes a method of controlling a terahertz-band communication cell having a coverage area and comprising a plurality of antenna structures each having an antenna transmitting a signal in the terahertz-band and at least one mirror which is moveable to reflect a terahertz-band signal from a neighbouring antenna, the method comprising dividing the coverage area into an array of tiles; determining the location of each antenna structure within the coverage area;

determining the location of a transmitter within the coverage area; and calculating the coverage obtained for at least one target tile within the coverage area using the locations of the transmitter and each antenna structure.

Each of the steps of the method may be carried out by a processor or controller which may be termed a network management component. The network management component may be implemented in hardware and may be located remotely from the communication cell and may be configured to communicate with the antenna structures.

The method may comprise calculating the coverage by determining for the at least one target tile one or more of the following properties: capacity, received power, path loss from the transmitter to the target tile and probability of line of sight between the transmitter and the target tile. The coverage may be determined by determining a three-dimensional model of the coverage area. Such a model may be termed a topographical model because it describes the physical features of an area, both geographical and man made constructions. The model may include the locations of the transmitter and each antenna structure and may model the coverage within the coverage area based on the locations of the transmitter and each antenna structure together with other properties such as those listed above. This model would be used in the process of calculating lines of sight, potential obstructions to such, possible positions of antennae and mirrors, and coverage areas as various mirrors etc. are realigned.

A topological coverage for the coverage area may be calculated by calculating the coverage for all tiles within the array. There may be n×m tiles and m may equal n. The set of tiles used to track the coverage from the various antennae and mirrors may be termed a topological model. n may be between 5 and 20 and is preferably dependent on the size of the coverage area. The number of tiles may be determined based on a desired granularity of coverage. For example, a 10×10 m area may be divided into 10×10 tiles or a 20×20 m area may be divided into 10×10 tiles with the latter selection having reduced granularity when compared to the first. Typically, there is a 1 to 1 relationship with 1 tile=1 meter.

The coverage may be calculated using a ray-tracing algorithm. However, ray tracing is typically computationally expensive and may be difficult to perform in real-time. Alternatively, other algorithms may be used, for example 3-dimensional clipping or hidden surface elimination. Such algorithms may be used to determine the probability of line of sight between the transmitter and the target tile and typically provide similar results to the ray tracing algorithm in a shorter amount of time. For optimum results, each algorithm may use a three-dimensional model of the area in which the antennae are mounted.

3-dimensional clipping is a means of eliminating items outside the field of vision of a viewer and objects outside the frustrum of vision (i.e. not in line of sight) are rendered as invisible. This technique is described for example in Generalized Two and Three Dimensional Clipping by M. Cyrus and J. Beck published in Computers & Graphics in 1978. It is also described in many text books for example "Computer Graphics Principles and Practice by Foley, Van Dam, Feiner and Hughes. Various improvements have also been made over the years, for example, A Simple and Efficient Algorithm for Line and Polygon Clipping in 2-D Computer Graphics by Sushil Chandra Dimri published in International Journal of Computer Applications in 2015.

Hidden surface elimination is a technique which allows determination of which surface of an object is visible (if it is partially oriented towards the location of the viewer) and also whether objects or surfaces are obscured fully or partially by other objects closer to the viewer. Objects which are not visible are not rendered. This technique is described for example in "A Characterization of Ten Hidden-Surface Algorithms" by Sutherland et al published in ACM Computing Surveys in 1974, This is also described in textbooks and improvements have been made over the years.

By replacing the "viewer" in these techniques with an antenna or mirror in the coverage area, such algorithms may be used to calculate whether or not the target tile is visible to a particular antenna or mirror. A target tile which is visible to the particular antenna or mirror may be marked as being covered from that particular vantage point. The total coverage for each target tile may be then considered as a composite of the coverage provided by all the individual antennae or mirrors which cover that target tile.

The method may further comprise determining a desired coverage for at least a specific location within the coverage area; determining whether the calculated coverage matches the desired coverage and if there is no match, adjusting at least one mirror of at least one antenna structure to provide the desired coverage.

The desired coverage will typically be one in which the type of blindspots that typically occur with line of sight communications are eliminated or at least reduced. The blindspots may be eliminated across the entire coverage area or for specific locations only. In other words, the desired coverage may be to provide line of sight (or virtual line of sight) for each specific location or the entire coverage area. The desired coverage may also include directing the signals to a particular tile(s) which has lower molecular absorption loss Determining the desired coverage may be based on historical data patterns for users within the coverage area. This may comprise predicting which specific locations within the coverage area have high density of users at particular times so that these specific locations can be targeted to have high signal strength at the particular time. For example, calculating the coverage may comprise determining a two-dimensional array of expected number of users per tile versus time may be created. This expected number of users may be closely related to the predicted service demand distribution.

Using this array, the positioning of the antenna structures and mirrors within them may be adjusted over time to maximise the number of users with coverage. In this way, the structure and method described may thus provide a high degree of coverage in specific areas, e.g. large urban areas with a high concentration of users such as a city centre or major thoroughfare rather than a blanket coverage of large rural areas. Alternatively, the desired coverage may be determined in real-time for a particular user at the specific location, for example by tracking the specific location within the coverage area of the particular user using GPS or similar tracking techniques.

Adjusting the at least one mirror may comprise moving the at least one mirror to reflect the terahertz-band signal from a neighbouring antenna, for example the mirror may be rotated using a motor. Adjusting the at least one mirror may comprise changing the curvature of the at least one mirror. As set out above, the overall aim is that by adjusting the at least one mirror, a virtual line of sight is provided between the transmitter and the specific location. The method may comprise determining commands to send to one or more antenna structures within the cell to adjust the mirrors.

In addition to adjusting the mirrors, other components (e.g. transmitter or receiver) within the communication cell may also be adjusted. Adjustments may be based on some or all of the current parameters within the communication cell. The parameters may include some or all of transmitter location, receiver location, transmitter antenna power, receiver antenna power, transmitter antenna gain, receiver antenna gain, transmitter velocity, receiver velocity, transmitter direction vector, receiver direction vector, moisture level in the environment, temperature level in the environment, capacity, received power and path loss.

Machine learning engines may be used to determine the coverage obtained and/or any adjustments to be made to the mirrors. The machine learning engines may in particular be used to predict user density versus time based on historical trends and thus the machine learning engines may determine which areas within the coverage area have highest user density at which times of the day. The method may thus comprise deriving a schedule in which adjustments are made to the mirrors (e.g. to rotate the mirrors or adjust their angles) at predetermined times of the day. In this way, coverage may be maximised in the areas having highest user density at the predetermined times of the day.

Machine learning engines may also be used to determine adjustments to be made to other components (e.g. transmitter or receiver) within the system. The machine learning engine may be remote, e.g. within the cloud, or local to the communication cell, e.g. adjacent a receiver within the communication cell. The communication cell may collect current network parameters and send these parameters to the machine learning engines.

Machine learning engines may also be employed to generate a set of probabilities for a handover between transmitting antenna. As a user moves through the coverage area, the signal will be handed over to the most appropriate antennae within the coverage area. This transfer of the signal and data carried by the signal represents a potential bottleneck to providing continuity of service. The method may thus comprise determining which of the plurality of antenna structures is currently providing a signal to a user and for other antenna structures within the plurality of antenna structures predicting the probability that each other antenna structure will be the next antenna structure to provide the signal to the user. The various probabilities may be used as a trigger to pre synchronise the data to be transmitted with the current transmitting antenna and the most likely handover antenna. For example, the method may comprise determining that the probability for a next antenna structure is above a first threshold value and synchronising the signal between the antenna structure currently providing the signal to the user and the next antenna structure. Actual handover may occur at a higher threshold value. Thus the method may also comprise determining that the probability for a next antenna structure is above a second threshold value which is higher than the first threshold value (e.g. first value is 0.8 and second value is 0.98) and transferring transmission of the signal from the antenna structure currently providing the signal to the user to the next antenna structure. It will be appreciated that other methods may also be used to generate the probabilities.

The method may be computer-implemented and may be practised with other computer system configurations, e.g. microprocessor systems, main frame computers and the like.

The present disclosure also describes a non-transitory computer readable medium, i.e. any storage device that can store data which can be read by a computer system, for storing a computer program which when implemented on a computer system causes the steps of the method above to be performed. Examples of a computer readable medium include a hard-drive, read-only memory, random-access memory, a compact disc, CD-ROM, a digital versatile disk, a magnetic tape, other non-transitory devices and other non-optical storage devices. The computer readable medium may also be distributed over a network coupled system so that the computer program code is stored and executed in a distributed fashion.

As demonstrated in more detail below, the proposed system and method show great improvement in the capacity, received power, path loss and line of sight for both indoor and outdoor environments when compared to a system without mirrors.

BRIEF DESCRIPTION OF THE DRAWINGS

This application contains at least one drawing executed in color. Copies of this patent or patent application publication with color drawing(s) will be provided by the Office upon request and payment of the necessary fee.

The teaching of the present disclosure can be readily understood by considering the following detailed description in conjunction with the accompanying drawings, in which:

FIG. 2b is schematic figure showing detail of the antenna of FIG. 2a;

FIG. 3b is a block diagram of the components for implementing the method of FIG. 3a;

FIG. 3c is a block diagram of an alternative set of components for implementing the method of FIG. 3a;

FIGS. 4a and 4b illustrate two types of desired coverage achieved using the method of FIG. 3a;

FIGS. 8a to 8d are 3d plots showing the variation in probability of line of sight (TPLOS) due to distance and mirror size for indoor communication systems having medium density blockage and high density blockage and for outdoor communication systems having medium density blockage and high density blockage, respectively, FIGS. 9a and 9b show the relationship of mirror coordination (0%, 25%, 50%, 100%), frequency (low (0.3 THz), medium (2 THz) and high (4 THz) and blockage density (low, medium, high) on the received power in indoor and outdoor environments respectively when using the described communication systems;

This application contains at least one drawing executed in color. Copies of this patent or patent application publication with color drawing(s) will be provided by the Office upon request and payment of the necessary fee.

DETAILED DESCRIPTION

Figure 1A:
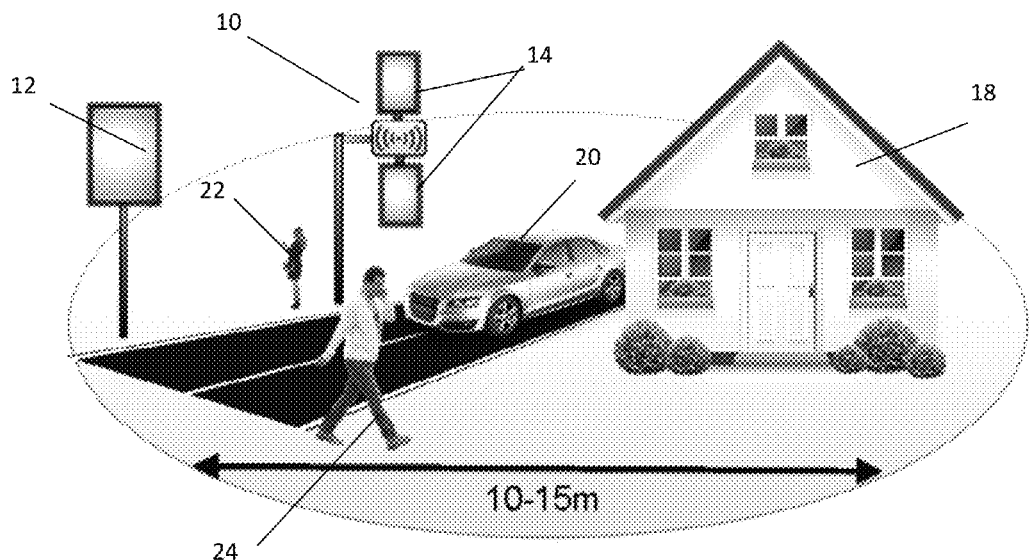
FIGS. 1a and 1b are schematic figure showing a communication system in an outdoor and indoor environment respectively.

FIG. 1a shows an example of an outdoor environment comprising at least one antenna structure 10 which forms part of a small cell which is preferably using terahertz-band communication. The antenna structure has a pair of moveable mirrors 14 which reflect signals from the neighbouring base station 12 to the target 24 which in this example is a moving pedestrian. The cell may comprise multiple additional antenna structures (not shown in FIG. 1a). Small means that the cell has coverage of between 5 to 20 meters by 5 to 20 meters. Even with a small cell, there will be objects which block and/or absorb the signal including static objects such as buildings 18 or moving objects such as vehicles 20 or other pedestrians 22.

Figure 1B:
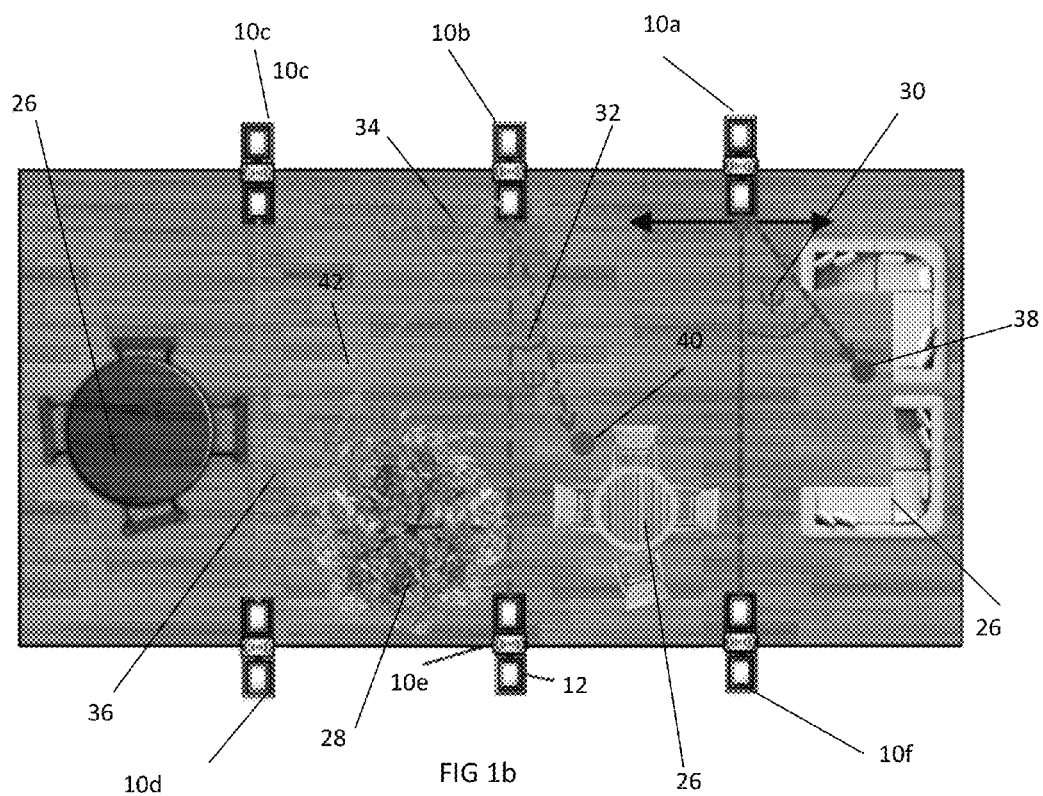

FIG. 1b shows an example of an indoor environment having a small cell which is also preferably using terahertz-band communication. In this environment there are objects which block and/or absorb the signal including the walls, furniture 26 such as tables and chairs or plants 28. It will be appreciated that the indoor environment of FIG. 1b is merely illustrative and the cell may be used in any type of indoor environments such as offices, shopping malls, home, etc.

This indoor cell comprises a plurality of antenna structures 10a to 10f each having an associated pair of moveable mirrors. As illustrated, here are six antenna structures with three antenna structures 10a to 10c equally spaced from one another on one side of the room and the other three antenna structures 10d to 10f arranged opposite the first three antenna structures. It will be appreciated that six antenna structures is merely illustrative and that different numbers and spacings of antenna structures can be used. Similarly, it will be appreciated that one antenna structures in FIG. 1a is also merely illustrative. As explained in more detail below, such small cells are able to maintain a decent level of signal quality for high end-to-end capacity in areas with high density of mobile users despite the problems of terahertz based communication outlined above. Deploying these small cells that operate in parallel with the macro cells as part of the wider communication network, also provides an opportunity to offload traffic in order to reduce the operation costs.

Figure 2A:
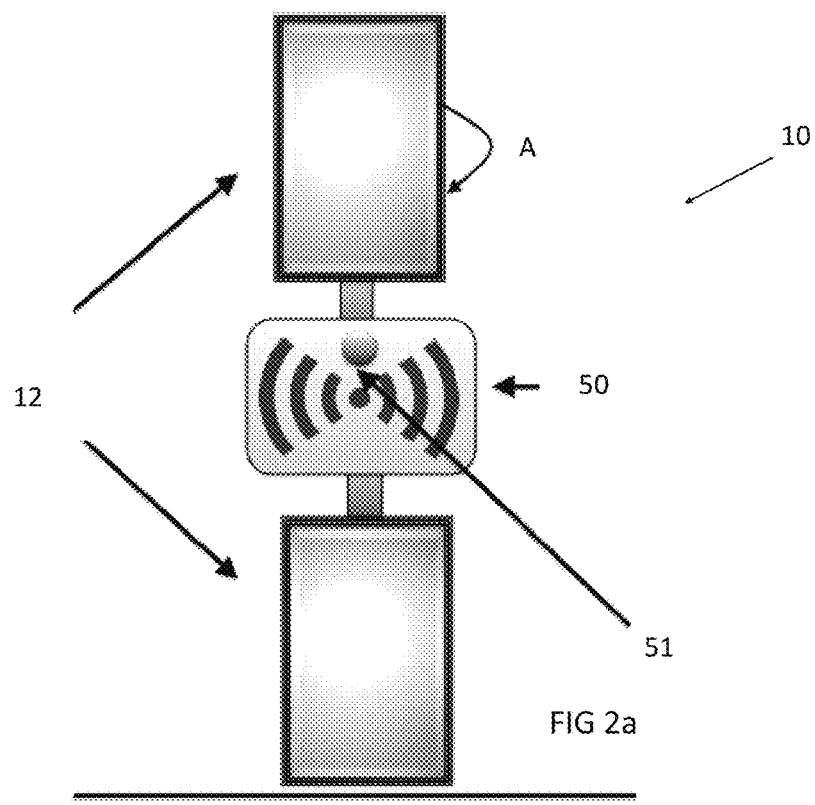
FIG. 2a is a schematic figure showing an antenna for use in the communication systems of FIGS. 1a and 1b.
Figure 2B:
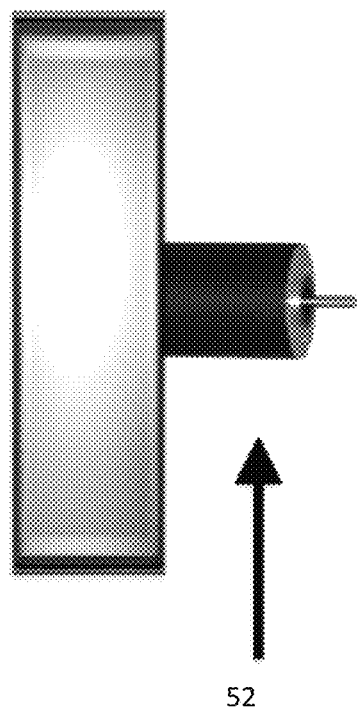

FIGS. 2a and 2b show more detail of each antenna structure 10 which comprise an antenna 50 and two mirrors 12. The antenna 50 is a patch terahertz antenna. In the arrangement of FIG. 2a, the antenna is centrally mounted between the two mirrors, with a mirror above and below the antenna. Other arrangements are possible. The antenna structure may also comprise an optional camera 51 which may be centrally mounted on the antenna and may be a 180° camera.

The antenna 50 may be a linear smart antenna array with N nodes and a total gain of GTx for the transmitter and GRx for the receiver. The antenna may have adaptive beamforming which is an existing technique for providing directional signals without having to move the transmitters and receivers. In the context of the antenna structure described above, this is needed to create a virtual line of sight. While reflecting terahertz rays, the antenna beamforming will point the direction towards the mirrors which will reflect the signals with minimum attenuation. The antenna may also have to perform beamsteering for synchronisation of the main lobe of the antenna with the mirror. $\Psi_i$ is the angle between the base of the area and the boresight of the antenna. $\Psi_i$ takes values in $G=[-\pi/2, \pi/2]$ so that the main lobe of the antenna is always directed into the area of transmission. The antenna may also control the beamwidth adaptively allowing the synchronisation of the $T_x$ antenna 3 dB zone with the mirror. In the analysis below, perfect conditions for beamforming, beamsteering and beamwidth are assumed.

Each mirror 50 is a dielectric mirror. Dielectric mirrors which reflect terahertz rays are known for example in "Short-Range Ultra-broadband terahertz communications: Concepts and perspectives," by Piesiewicz et al in IEEE Antennas and Propagation Magazine, vol 49 no 6, P 24-39, 2007 or "Flexible all-plastic mirrors for the thz range" by Turchinovic et al in Applied Physics A, vol 74, P 291-293, 2002 or "Omnidirectional terahertz mirrors: A key element for future terahertz communication systems" by Krumbholz et al in Applied Physics Letters, vol 88, P 202905, 2006. In the paper by Piesiewicz, the interior of a room is totally covered to allow reflection. Even though there are benefits of such an approach, it is impractical and also costly.

Each mirror may comprise a plurality of thin layers of dielectric material, for example as used in the models below there may be 4 layers of high-resistant silicon which are each 63 µm thick. An optional optical coating may also be applied which enables the selection of specific wavelengths that can be reflected.

Mirrors having a broad range of incident angles will reflect non line of sight signals to provide virtual line of sight. The omnidirectional mirrors of the paper by Krumbholz satisfy this requirement. However, for perfectly reflecting signals between a transmitter and a receiver, the beams of the antennae should be synchronised and thus the beams should be pointing to each other or the mirrors. To provide the virtual line of sight, the mirrors need to adaptively change to compensate for the rays' incident angle.

This is at least in part achieved as shown in FIG. 2b in which the mirrors are generally planar and are moveable using rotation. A motor 52 is attached to each mirror 12 to control rotation of the mirror 12 and hence to control the reflection angle at each mirror. The rotation angle is illustrated by arrow A in FIG. 2a. Each mirror may be separately controlled by an individual motor or alternatively the rotation of the two mirrors may be the same. Curved mirrors may also be used instead of or together with planar mirrors. The mirrors may also be moveable to change the curvature of the mirror, for example using variable radius mirrors (VRMs). These are convex mirrors which allow the radius of curvature of the mirror to be dynamically adjusted. Adjusting the radius of curvature will change the angle of reflection at the mirror.

Although the mirrors are coupled to a particular antenna, the mirrors are used to reflect the signals from the neighbouring antennae rather than their own signal. The mirrors are individually controlled to set a desired angle of reflection from each mirror to target a critical coverage area. For example as shown in FIG. 1b, the signal from the sixth antenna 10f is reflected through angle $\psi_1$ 30 at the first antenna to target a user 38 on the sofa, i.e. on the right side of the environment. Similarly, the signal from the fifth antenna 10e is reflected through angle $\psi_2$ 32 at the second antenna to target a user 40 at a table, i.e. in a central part of the environment. As a final illustration, the signals from the third antenna 10c are reflected through angles $\psi_3$ 34 and $\psi_4$ 36 at the second and fourth antennae to target a user 42 on the left side of the room. At user 42, the signal strength will be aggregated and thus user 42 may be considered to have been given priority compared to the other two users.

Figure 3A:
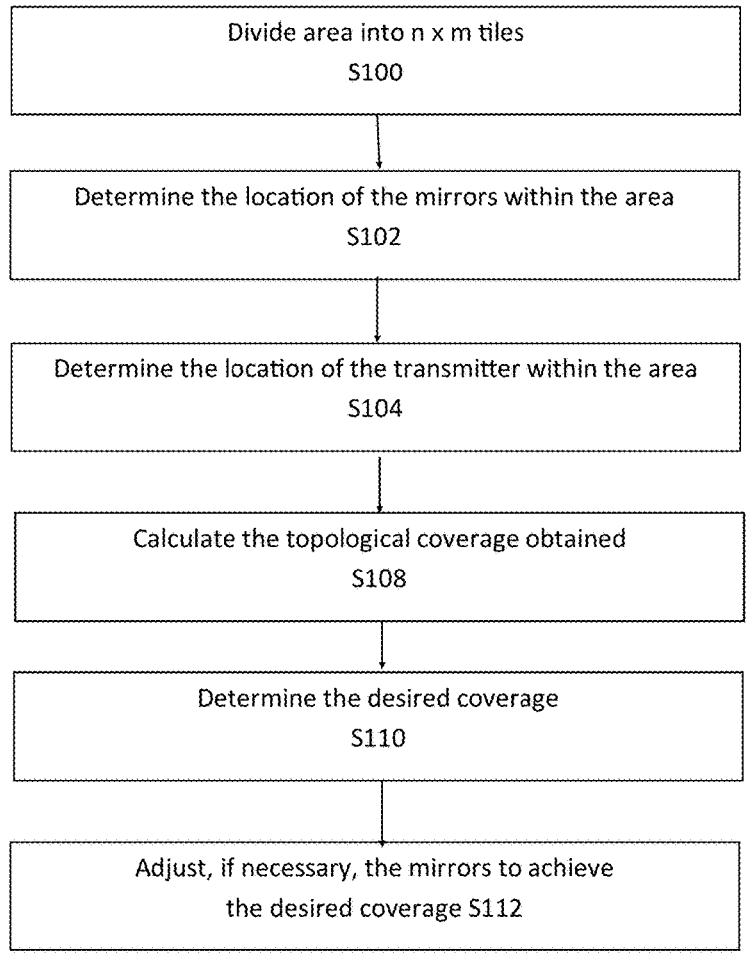
FIG. 3a is a flowchart showing how the communication system of FIGS. 1a and 1b can be managed to give the desired coverage.

FIG. 3a is a flowchart setting out a method which can adaptively adjust the position of the mirrors to achieve a desired coverage. In a first step S100, the whole coverage area (or cell) having dimensions of x and y meters is divided into a grid or array of nxm tiles. The dimensions of the tile and number of tiles can be decided based on the desired granularity of coverage. For example, a 10×10 m area may be divided into 10×10 tiles or a 20×20 m area may be divided into 10×10 tiles. The next step is to determine where the mirrors are located in the area S102. At the same time, the location of other reflection or scattering points may also be determined. The location of the transmitter is then determined at step S106. For a static transmitter, this is straightforward but the transmitter may also be moving, e.g. a walking pedestrian. In this scenario, the location of the transmitter can be determined using GPS, signal triangulation or other similar techniques.

At step S108, the topological coverage of the system is then determined. The topological coverage may be determined using a topological model, namely the set of tiles which is used to track the coverage from the various antennae and mirrors. When determining the topological model, a topographical model which describes the physical features of an area, both geographical and man made constructions may also be used. This model would be used in the process of calculating lines of sight and potential obstructions to the mirrors and antennae. This model could also determine possible positions of antennae and mirrors and coverage areas as various mirrors are realigned. One method for determining the topological coverage is to use a ray tracing algorithm which incorporates principles from optics. The method calculates the incident angles based on the defined rays from the transmitter to the mirror and between mirrors. For each tile, one or more of the capacity, received power, path loss and probability of line of sight can also be determined to calculate the topological coverage. More information on the ray-tracing algorithm and modelling technique is set out below.

Aiming to present an accurate multi-ray propagation model for the 0.06-10 THz band communication, the ray tracing method incorporates principles from optics. This is based on the characterisation of electromagnetic waves. The multi-ray model considers propagation effects, including spreading ($\Psi(f,r)$), molecular absorption ($\beta(f,r)$), reflection ($\Gamma(f,r)$) and scattering ($\zeta(f,r)$) in which f is frequency and r is distance. In the following, each of these effects are formulated.

Spreading is the effect of electromagnetic signal propagation for a LoS configuration and in the case of the terahertz band can be obtained from:

$$\Psi(f, r) = \left(\frac{c}{4\pi f r}\right)^2,$$

Where c is the speed of light in a vacuum. Particularly the effect of spreading in the tetra-hertz band can be quite small in terms of gain, and can be an issue for long-range communication links.

The molecular absorption loss impacts considerably on the terahertz signals and must be considered. This can be characterised by:

$$k(f) = \sum_y \frac{p}{p_0} \frac{T_0}{T} \sigma^g(f),$$

Where p is the system pressure, $p_0$ is the reference pressure, $T_0$ is the standard temperature, T is the system temperature and $\sigma^g(f)$ is the absorption cross-section. As set out in "Channel modelling and capacity analysis for electromagnetic wireless nanonetworks in the terahertz band" by Jornet et al in IEEE Transactions on Wireless Communications vol 10, no 10, P 3211-3221, 2011, the major contributor to the total absorption is water vapour and this is the only gas considered.

The radiative transfer theory is used for quantification of the molecular absorption loss depending on frequency and distance. For this, the Beer-Lambert law is considered and represented as:

$$\beta(f,r) = e^{-1/2 k(f) r}.$$

The Kirchhoff theory is used for calculating the reflection loss of terahertz waves. The Fresnel reflection coefficient and the Rayleigh roughness factor are used in the analysis. The Fresnel reflection coefficient can be obtained as:

$$R(f) = \frac{\cos(\theta_i) - n_i \sqrt{1 - \left(\frac{1}{n_i}\sin(\theta_i)\right)^2}}{\cos(\theta_i) + n_i \sqrt{1 - \left(\frac{1}{n_i}\sin(\theta_i)\right)^2}}$$

in which $\theta_i$ is the angle of the incident wave and $n_t$ is the refractive index of a medium.

The Rayleigh roughness factor can be defined as:

$$\rho(f) = e^{-\frac{\sigma(f)}{2}},$$

With $$G(f) = \left(\frac{4\pi\omega \cos(\theta_i)}{c}\right)^2,$$

Where $\omega$ is the standard deviation of the surface roughness and c is the free space wavelength of the incident wave. Thus the reflection loss can be written as:

$$\Gamma(f, r) = \sum_n \Psi(f, r) \times \beta(f, r) \times R(f) \times \mu(f)$$

in which n is the number of rays.

Scattering affects terahertz signals based on the roughness level of the surface that it reflects from. This is considered to be critical to the communication link and should also be taken into account. First we consider the Beckham Kirchhoff theory for obtaining the scattering coefficient and its approximation which is represented as:

$$S(f) = -e^{\frac{-2 \cos(\theta_i)}{\sqrt{n_i^2 - 1}}} \times \sqrt{\frac{1}{1 + g + \frac{g^2}{2} + \frac{g^3}{6}}} \times \sqrt{p_0 + \frac{\pi \cos(\theta_1)}{100}\left(g e^{v_s} + \frac{g^2}{4} e^{\frac{-v_s}{2}}\right)}$$

in which values for $p_0$, g, $v_s$ and $\theta_1$ can be found in "Modified Beckmann Kirchhoff scattering model for rough surfaces with large incident and scattering angles" by Harvey et al in Optical Engineering vol 46, no 7, P 078002, 2007.

Thus the scattering loss can be obtained considering spreading, molecular absorption, the Rayleigh roughness factor and the scattering coefficient of n rays, and is represented as:

$$\zeta(f, r) = \sum_n \Psi(f, r) \times \beta(f, r) \times R(f) \times S(f)$$

The ray tracing algorithm is accurate but is also computationally expensive and would be difficult to use in real-time. Accordingly, other algorithms with higher computational speed may be used, such as three dimensional clipping and hidden surface elimination. Such algorithms do not accurately render the scene but do allow the actual visibility of the components of a scene to be accurately identified. 3D clipping is a means of eliminating items outside the field of vision. This means that objects outside the cone of vision are not rendered as we know they are invisible. Hidden surface elimination allows it to be determined what surface of an object is visible (if it is partially oriented towards the location of the viewer) and also whether objects or surfaces are obscured fully or partially by other objects closer to the viewer.

Like ray tracing, these algorithms allow a determination of whether each tile within the area is visible to any of the antennae or mirrors (which are the viewers). This means that there is a line of sight from at least one antenna or mirror and the tile can be recorded as having a line of sight. The overall topological coverage can then be considered as a composite of all of the coverage of each individual tile. Where there is overlapping coverage then there may be scope to use technologies such as beamforming to maximise the strength of coverage in this particular tile.

The method also includes determining the desired coverage at S110. The desired coverage will typically be one in which the type of blindspots that typically occur with line of sight communications are eliminated or at least reduced. Accordingly, if a tile(s) does not have a line of sight from any antennae or mirrors, we do have full coverage across the cell. In other words, the calculated coverage does not match the desired coverage. Thus, it will be necessary to adjust the mirrors as explained below to provide coverage in each tile S112. Alternatively, individual tiles may be targeted rather than providing uniform coverage across the whole area. For example, the desired coverage may also include ensuring a higher strength of signal reception in a particular tile and again the mirrors can be adjusted as explained below so that there are sufficient rays in each tile. The desired coverage may also include directing the signals to a particular tile(s) which has lower molecular absorption loss and the mirrors can be adjusted as explained below to direct the reflections to this tile(s).

Alternatively, the desired coverage may be predicted based on historical data patterns to identify the location and time patterns of user density and employ this as a high level plan to maximise user coverage over time. Thus, certain tiles within the area which are predicted to have high density of users at certain times may be targeted at the appropriate times and the mirrors could be adjusted accordingly to achieve the desired targeting. The desired coverage could be also be one which targets individual users in real time. The user could be tracked and the mirrors adjusted to target the individual user as they migrate across the area, thus enabling the delivery of critical high QoS services to specific applications such as medical devices, connected cars etc.

In general, to achieve the desired coverage, the system should ideally know the location of the transmitter and the receiver and adaptively change the mirrors' angles to provide the virtual visibility between them and the antenna beams of both the transmitter and the receiver should ideally be pointing towards at least mirror.

The method described above may be computer-implemented and FIG. 3b shows one possible control system for implementing the method. The control system may be part of each antenna structure. The control system comprises a processor 70, e.g. a central processing unit implemented in hardware, which implement the method above. The processor is connected to a memory 72 (e.g. RAM, ROM or other suitable storage) which stores the computer code which implements the method. The memory may also store the location of the transmitter and the antenna structures and this information may be received via an interface 74 which is connected to the transmitter and antenna structures. The interface 74 is an input/output device to receive information on the communication cell. If any changes to the rotation and/or internal angle of the mirror are required, the processor may send these instructions to the mirror controller 76. This communicates with the mirror via the interface 74. The control system is also connected to a networking interface 78, normally via interface 74. The networking interface 78 connects the control system to the cloud. In this way, the control system is connected to and is typically submissive to a cloud-based network management system.

Figure 3B:
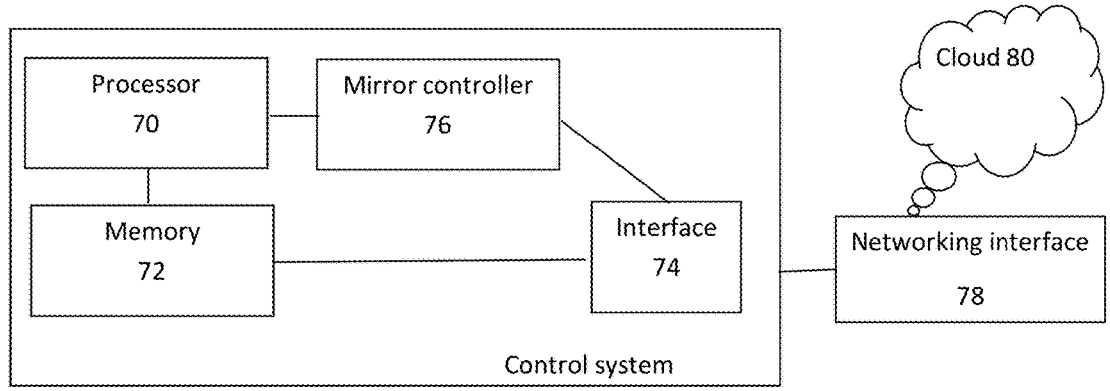

In FIG. 3b, the control system is local to and coupled to an antenna structure within the communication cell. Alternatively, the control system may be remote from the communication cell. The control system may be connected to each antenna structure, e.g. via a wireless connection so that the processing can be done from a remote location, e.g. from a remote server or in the cloud.

Figure 3C:
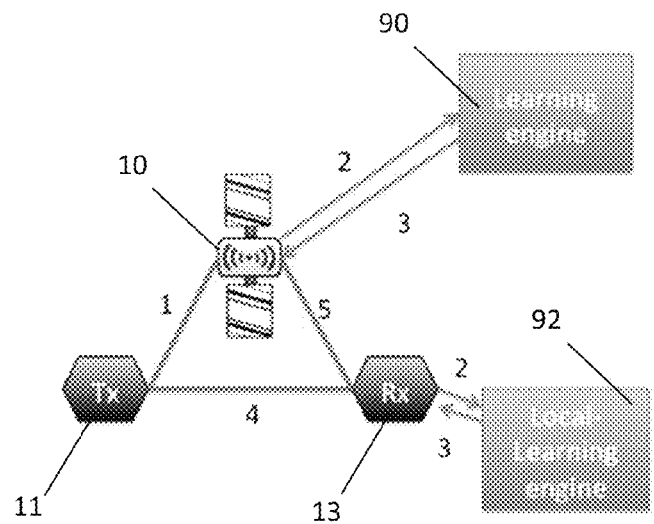

FIG. 3c shows one system for performing the steps of FIG. 3a using machine learning. As shown, there is a transmitter probes channel 1 between the transmitter 11 and the antenna structure 10. There are also channels between the transmitter 11 and the receiver 13 and between the antenna structure 10 and the receiver 13. As set out in FIG. 3a, the location of the mirrors (i.e. antenna structures) and the transmitter are determined at steps S102, S104. To model the topological coverage and ultimately to determine the adjustment to the mirrors, additional information could also be collected and the table below gives the examples of data which could be collected; these could be collected in addition to the data mentioned above.

| Feature name | Type | Units |
| --- | --- | --- |
| Transmitter Location | numerical | [x, y] meters |
| Receiver Location | numerical | [x, y] meters |
| Transmitter Antenna power | numerical | watts |
| Receiver Antenna power | numerical | watts |
| Transmitter Antenna gain | numerical | decibels |
| Receiver antenna gain | numerical | decibels |
| Transmitter velocity | numerical | meters per second |
| Receiver velocity | numerical | meters per second |
| Transmitter direction vector | numerical | vector |
| Receiver direction vector | numerical | vector |
| Moisture level in the environment | numerical | meters per second |
| Temperature level in the | numerical | meters per second |
| Capacity | numerical | bits per second |
| Received power | numerical | decibels |
| Path loss | numerical | decibels |

The parameters above are the recommended parameters to be used in a machine learning environment and it will be appreciated that all or a subset of these parameters may be used. These parameters include propagation data together with traffic and mobility data. As shown, these parameters are sent to a remote learning engine 90 over a channel as denoted by arrow 2 and also to a local learning engine 92 over a channel as denoted by arrow 2. The system may only include one of the learning engines. For example, the remote learning engine 90 may sit in the control plane of the network, i.e. in the cloud. The learning engine dynamically adjusts the mirrors' configuration as a result of the constant classification model outcomes on the networks behaviour and patterns. This cross-layer approach will bring the network management to the physical layer, adding a new level of efficiency. It is also possible that the design of the machine learning model may provide mirror coordination autonomously, e.g. by using a local machine learning engine 92.

Both the remote and local learning engines need training before they can be used to configure the mirrors. Such training can be done off-line. Once the training has been done, the trained machine learning engines 90, 92 can be used to generate recommended parameters which will provide the desired coverage. These recommended parameters are generated using the parameters on the current network parameters and current network performance which have been sent to the learning engines together with policies as explained below. Effectively the learning engines set a network reconfiguration request which is intended to enhance performance. The recommended parameters may be sent from the receiver 13 to the transmitter 11 as shown by arrow 4, for example if there are any recommended changes to be made to the transmitter. The adjustments to the mirror are sent from the receiver 13 to the antenna structure 10, particularly for a local learning engine 92. For the remote learning engine, the adjustments to the mirror are sent direct from the remote learning engine to the antenna structure.

The machine learning engines may in particular be used to predict user density versus time based on historical trends and thus the machine learning engines may determine which areas within the coverage area have highest user density at which times of the day. The method may thus comprise deriving a schedule in which adjustments are made to the mirrors (e.g. to rotate the mirrors or adjust their angles) at predetermined times of the day. In this way, coverage may be maximised in the areas having highest user density at the predetermined times of the day.

Figure 3D:
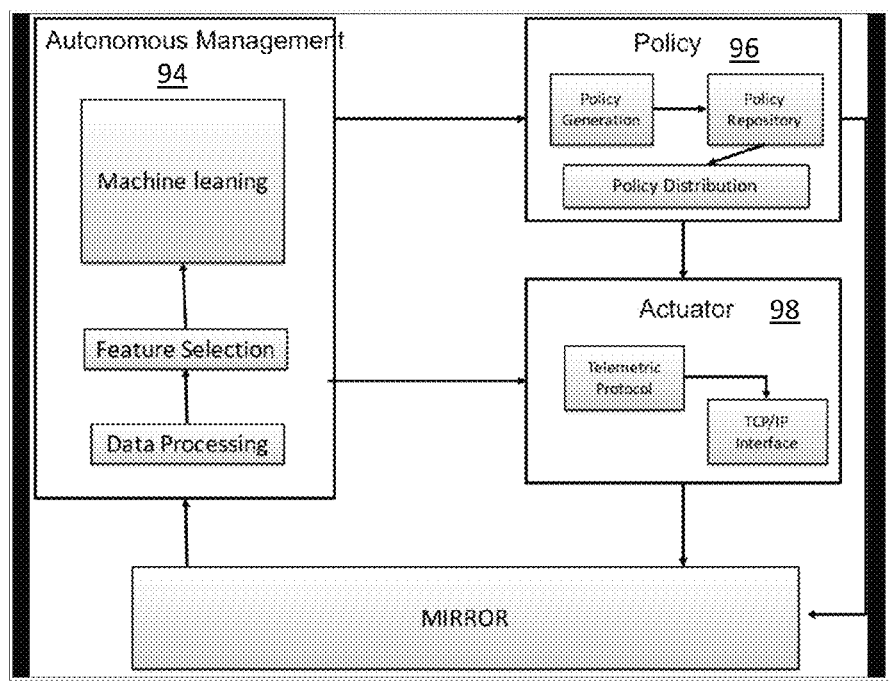
FIG. 3d is a block diagram of further detail for the system of FIG. 3c.

A network management component for the achieving of autonomous mirror configuration, which enables its rotation, is shown in FIG. 3d. This network management component is comprised of three blocks: an autonomous management component 94, a policy component 96 and an actuator component 98. Data from the network, captured by various forms, is processed and incorporated into a machine learning model that classifies the network conditions (including mobile nodes geolocation). Policies interpret the conditions of the network and translate them into mirror configuration values. The actuator component 98 will then ensure the execution of the configuration updates, for example through a TCP/IP protocol that enables telemetric functions in the motor attached to each mirror.

The autonomous management component 94 is responsible for gathering data from the mirrors and thus an arrow is shown from the mirror of the antenna structure to the autonomous management. The autonomous management component 94 has a data processing module and a feature selection module which feed into the machine learning. The machine learning models are able to classify/identify the current status of the mirrors, and possibly perform characterization as well. The autonomous management component 94 outputs its results to both the policy component 96 and the actuator component 98.

The policy component 96 is responsible for the policies that will govern the mirrors cooperatively. Thus, this component comprises a policy generation module which provides policies to a policy repository. Policies can be sent from the policy repository to a policy distribution module. The policies can be sent to the infrastructure 98. Moreover, the policy component 96 is important for creating determined network profiles based on the machine learning models obtained from the autonomous management component 94. Accordingly, the policy component 96 can also output direct to the mirror of the antenna structure or to other components within the network (e.g. transmitter, receiver).

The actuator component 98 is responsible for managing the mirrors as well as adjusting its configuration and scalability to accommodate the policies received from the policy component 96. Thus, the actuator component 98 comprises a telemetric protocol and a TCP/IP interface. The actuator component 98 output direct to the mirror of the antenna structure to adjust the mirrors as required through the telemetric protocol and the TCP/IP interface.

In summary, at the end of the process, set up commands are sent to the equipment within the network. These commands may be received from one or both of the actuator component 98 and the policy component 96. The architecture works like a feedback system, in which the current status of the network is based on the previous status. This will enable both flexibility and performance enhancement. The autonomous management component is the central part, in which it can give enough information for policies generation as well as direct control of the infrastructure in emergency cases. The policies are connected both to the network and the infrastructure, in case no management protocol is needed. These components thus function as a controller to control the mirrors.

It should be noted that the present disclosure can be implemented in a combination of software and hardware, e.g. using application specific integrated circuits (ASIC), a general-purpose computer or any other hardware equivalents. Each of the components and modules described may be implemented on one or more processors, e.g. a microprocessor, which may be located together or separately. The functionality of each component or module may thus be shared across multiple processors as required.

Figure 3E:
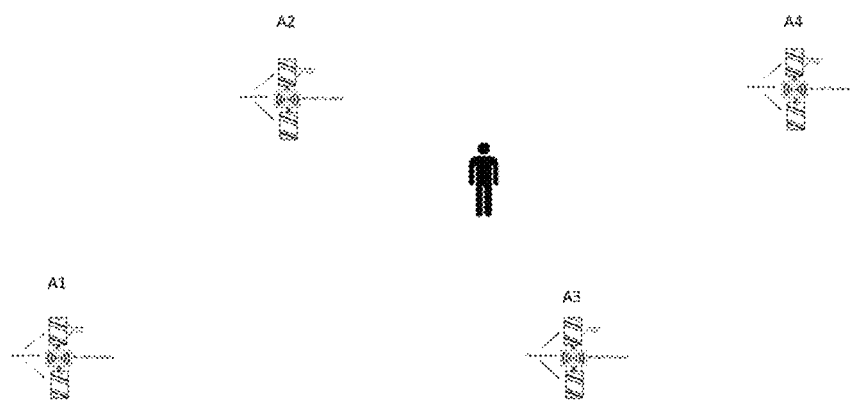
FIGS. 3e and 3f show the a user at two different locations within a coverage area having four antenna structures.
Figure 3F:
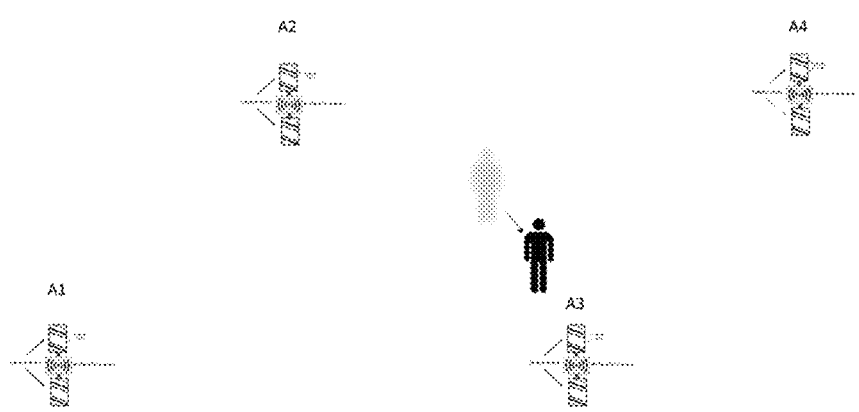

FIGS. 3e and 3f illustrate how machine learning algorithms may be used to improve handover. Where multiple antennae or transmitters are present and where user handovers between transmitting antennae are frequent, one of the main bottlenecks in the system is moving the data to be transmitted to the correct antennae in time to ensure continuity of service. This is very important where there is a very high QoS requirement and little tolerance for latency or even short interruptions in service. To address this, in addition to performing a handover as required, there should be a handover prediction methodology in place in the antennae management.

For example, in FIG. 3e, the user is currently being covered by antenna structure A2. A machine learning algorithm can be trained, e.g. using historical data for a user, to predict the probability that A2 will need to handover to adjacent antenna structures A1, A3 or A4. The probability will depend on the way a user moves within the coverage area. Examples of probabilities for each adjacent antenna structure are:

| Antenna | Probability of Handover |
|---------|------------------------|
| A1      | 0.1                    |
| A3      | 0.6                    |
| A3      | 0.3                    |

As shown in FIG. 3f, the user has moved and a new set of probabilities is determined:

| Antenna | Probability of Handover |
|---------|------------------------|
| A1      | 0.02                   |
| A3      | 0.9                    |
| A4      | 0.08                   |

The various probabilities can be used as a trigger to pre synchronise the data to be transmitted with the transmitting antenna and the probable handover antenna. This can be integrated with the handover logic also in a means as indicated by the below pseudo code.

```
Simple Handover Logic psuedo code example
const sync_threshold = 0.8;
const handover_threshold = 0.98;
Antenna::Handover {
For each Antenna A in (1..N) {
        If NOT ( this Antenna )
        {
            If(P(A,"Handover") > sync_threshold){
                synchronise(this, A)
            }
            If(P(A,"Handover") > handover_threshold){
                handover(this, A);
            }
        }
    }
}
```

As shown both the synchronise and handover operations between antennae are probability based where the synchronise occurs at a lower probability threshold and followed as the case may be by a handover between the antennae. It will be appreciated that the machine learning algorithm may be an extension of the software employed to initiate the actual handovers.

Figure 4A:
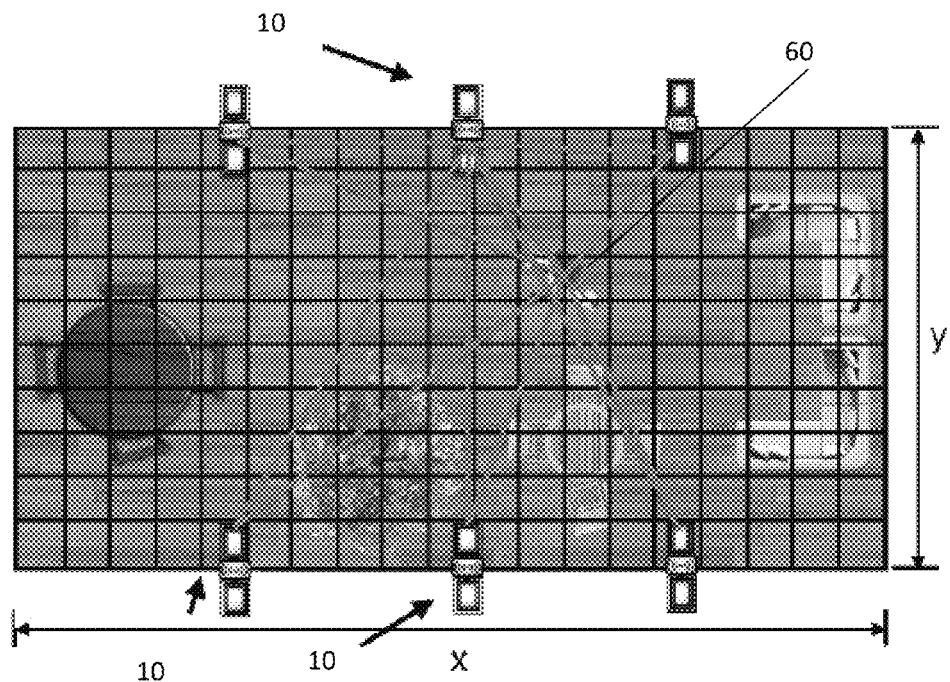
Figure 4B:
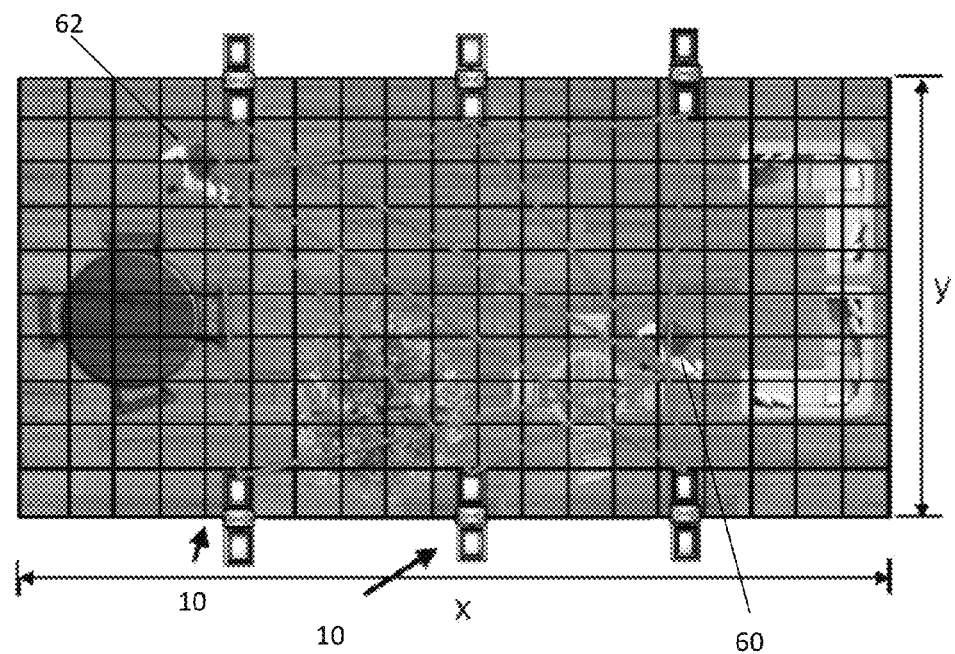

FIGS. 4a and 4b give further examples of how the reflection angles of each mirror may be changed to co-ordinate direction of rays from a plurality of the antenna structures to a specific location which may be termed a critical coverage area. FIG. 4a illustrates how the beams from a base station (or transmitter) which is placed in the central-top position are directed by the antenna structures 10 towards a user 60 (or receiver). As shown each antenna structure reflects at least one ray towards the user 60 and thus even if the signals which pass through the plant or table are absorbed, there will be a line of sight via another path. In FIG. 4b, communication between two users is shown. Each antenna structure reflects at least one ray from one user 62 (the transmitter) towards the other user (the receiver) 60. Again, even if the signals which pass through the plant or table are absorbed, there is at least a virtual line of sight between the two users provides by at least one of the rays.

FIGS. 5a to 12b show some results using the ray tracing algorithm to model coverage within a cell. Typically the results compare a cell in which there is only a terahertz antenna with a cell in which the terahertz antenna is used with mirrors. The first arrangement is termed "static coverage" and the second is termed "mirror-assisted coverage".

Figure 5A:
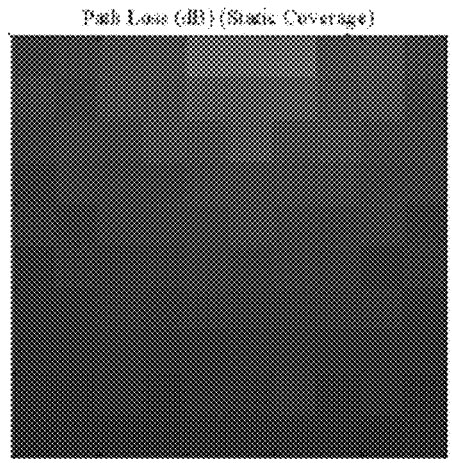
FIGS. 5a and 5b are heatmaps showing the path loss over a 10 m×10 m area at 0.3 THz for a conventional communication system and the described communication system, respectively.
Figure 5B:
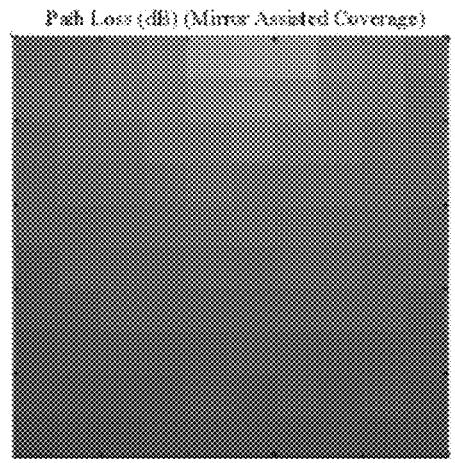

FIGS. 5a and 5b show the path loss within a 10×10 m area for "static coverage" and "mirror-assisted coverage" respectively. In both cases, the antenna is emitting at 0.3 THz and the area has been divided into 10×10 tiles. The results are calculated using a path-loss model which is derived using the ray-tracing algorithm detailed above by adding the attenuation loss of each signal propagation effect (spreading ($\Psi$), molecular absorption ($\beta$), reflection ($\Gamma$) and scattering ($\zeta$) in decibels and this is represented as:

$$\alpha(f, r) = 10 \times \log_{10}(\Psi(f, r)) + \\ 10 \times \log_{10}(\beta(f, r)) + 10 \times \log_{10}(\Gamma(f, r)) + 10 \times \log_{10}(\zeta(f, r))$$

For each tile within FIG. 5b, the mirrors are directed to beam the rays towards a specific tile. Therefore, each tile has lower path loss intensity for the mirror-assisted coverage compared to the static. This is due to the rays which were previously attenuated based on the reflection and scattering of rough surfaces in the FIG. 5a arrangement being redirected through the mirrors. This compensates for lower total path loss in each tile.

Figure 5C:
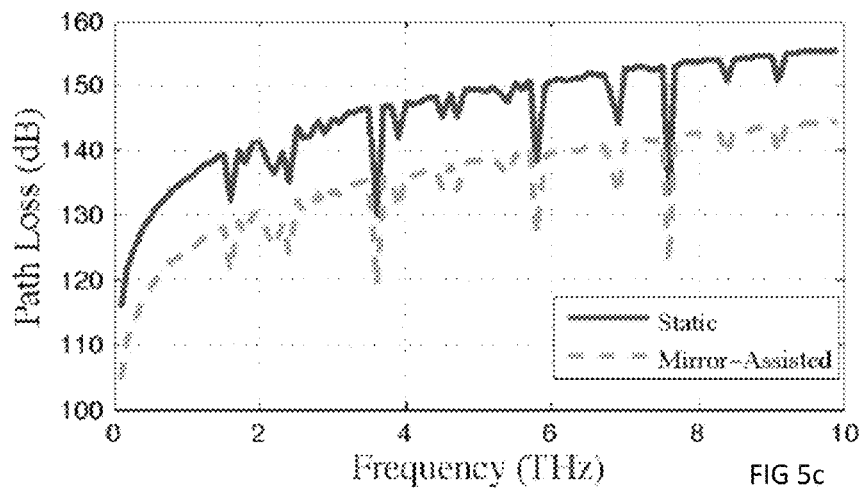
FIG. 5c is a graph plotting path loss (dB) against frequency (THz) for 10 m×10 m area for a conventional communication system and the described communication system.

FIG. 5c compares the path loss against frequency for both the "static coverage" and the "mirror-assisted coverage". Path loss increases with frequency due to the molecular absorption and the distribution of water vapour over frequency. However, once again the mirror-assisted case improves the path loss as the frequency is varied to the higher end of the terahertz spectrum.

As an alternative, or in addition to measuring path loss, the total power on each tile can be considered when calculating the topological coverage. FIGS. 6a to 6e explore the received power within an indoor environment and FIGS. 7a to 7e within an outdoor environment. Link budget analysis can be used to model the received power in the terahertz band communication (and also millimeter-wave communication). The following formula is used:

$$R_{px} = P_{tx} + G_{tx} + G_{rx} - \alpha(f,r) - \gamma,$$

where $R_{px}$ is the received power, $P_{tx}$ is the transmission power, $G_{tx}$ is the antenna gain in the transmitter, $G_{rx}$ is the antenna gain in the receiver and $\gamma$ is the loss resulting from shadowing.

The indoor environment is an office of 5×5 m with standard temperature and pressure to maintain the proper level of water vapour. The parameter values were set at $P_{tx}$=1 dBm with 7.4 dB conversion loss, $G_{tx}$ and $G_{rx}$ are equal to 30 dBi. The receiver has a conversion gain of 8 dB with a noise figure of 7.5 dB and $\gamma$=−74 dBm. This results in $$R_{px} = 127.7 - \alpha(f,r).$$

Figure 6E:
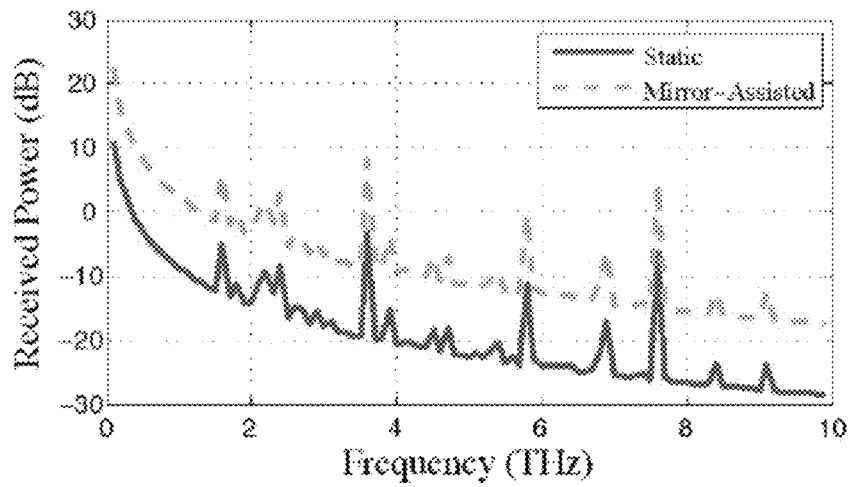
FIG. 6e is a graph plotting received power (dB) against frequency (THz) for a 5 m×5 m indoor area for a conventional communication system and the described communication system.
Figure 6A:
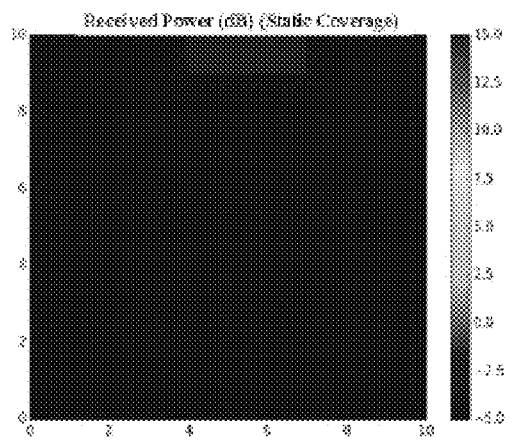
FIGS. 6a to 6d are heatmaps showing the path loss over a 5 m×5 m indoor area at 0.3 THz for a conventional communication system and the described communication system having no blockage, medium density blockage and high density blockage, respectively.
Figure 6B:
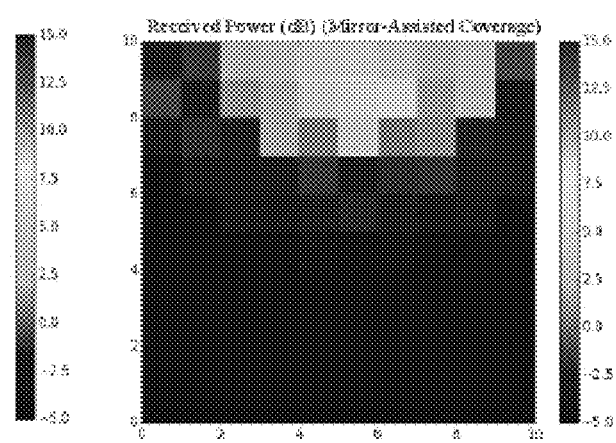

FIGS. 6a and 6b compare the power received at each tile in the indoor environment for the static coverage" and "mirror-assisted coverage" respectively. In both arrangements the transmitter is placed at the central-top position and is transmitting at 0.3 THz. FIG. 6b shows that the received power is higher for a larger area around the transmitter by appropriate angling of the mirrors than when no mirrors are used in FIG. 6a. The received power is dependent on frequency but FIG. 6e also shows that the mirror-assisted case improves the received power as the frequency is varied to the higher end of the terahertz spectrum.

The outdoor environment is an area of 20×20 m with a moving pedestrian walking along a path in the city centre lined with buildings. Signal reflection and scattering is found in the environment as they are reflected from building walls as well as other objects in the environment (e.g. trees and benches). For the mirror-assisted coverage, the mirrors are placed on either side of the road with the antennae. The parameter values were set at $P_{tx}=2$ dBm, $G_{tx}$ and $G_{rx}$ are equal to 21 dBi. The receiver has a conversion gain of 8 dB with a noise figure of 7.5 dB and γ=−50 dBm. This results in $R_{px}=141.7-\alpha(f,r)$.

Figure 7E:
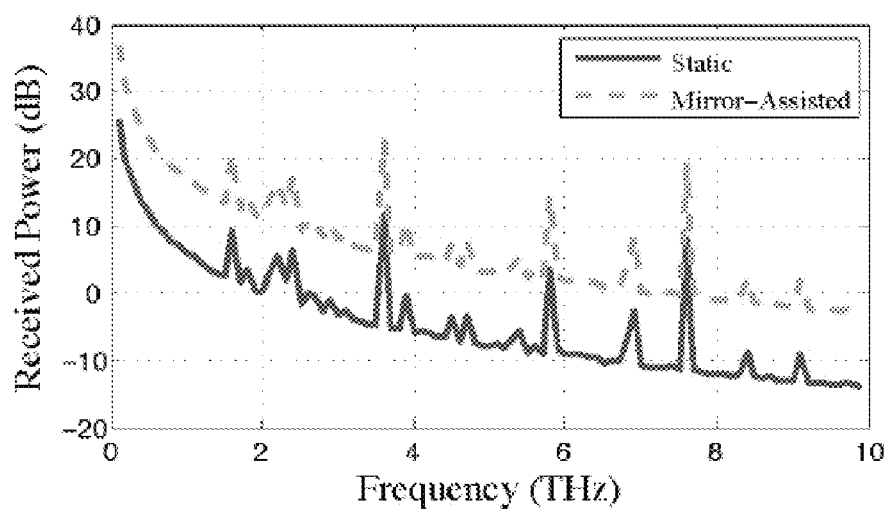
FIG. 7e is a graph plotting received power (dB) against frequency (THz) for a 20 m×20 m outdoor area for a conventional communication system and the described communication system.
Figure 7A:
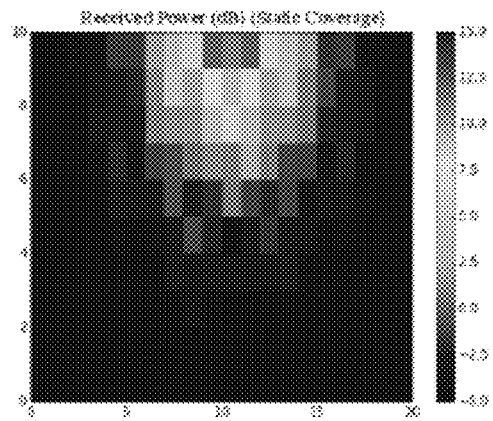
FIGS. 7a to 7d are heatmaps showing the path loss over a 20 m×20 m outdoor area at 0.3 THz for a conventional communication system and the described communication system having no blockage, medium density blockage and high density blockage, respectively.
Figure 7B:
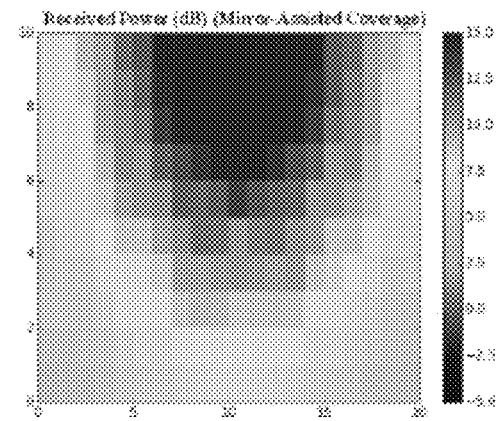

FIGS. 7a and 7b compare the power received at each tile in the outdoor environment for the static coverage" and "mirror-assisted coverage" respectively. In both arrangements the transmitter is placed at the central-top position and is transmitting at 0.3 THz. FIG. 7b shows that the received power is higher for a larger area around the transmitter by appropriate angling of the mirrors than when no mirrors are used in FIG. 7a. The received power is dependent on frequency but FIG. 7e also shows that the mirror-assisted case improves the received power as the frequency is varied to the higher end of the terahertz spectrum even though there is increased power degradation at higher frequencies due to molecular absorption.

Figure 6C:
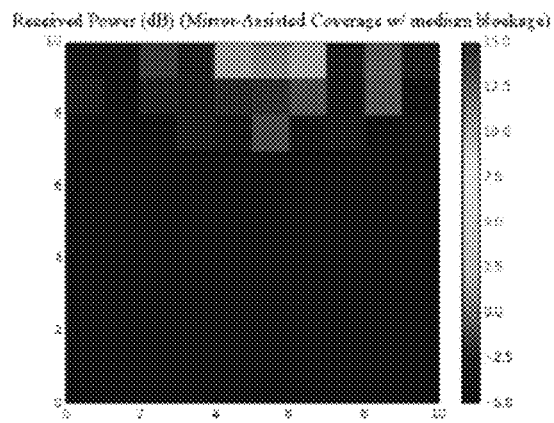
Figure 6D:
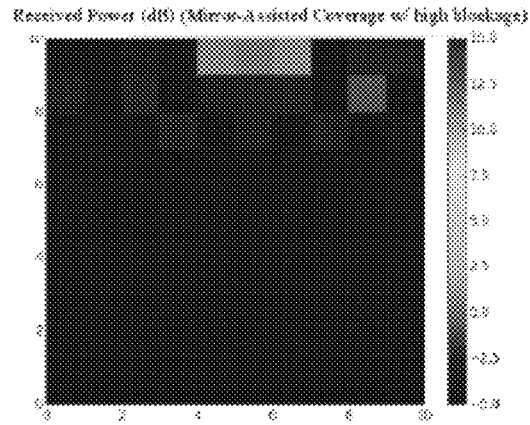
Figure 7C:
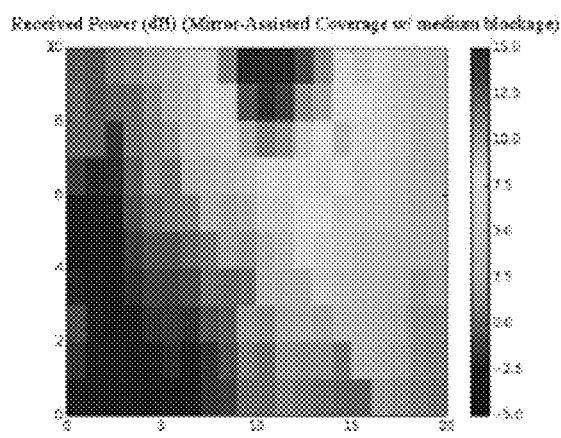
Figure 7D:
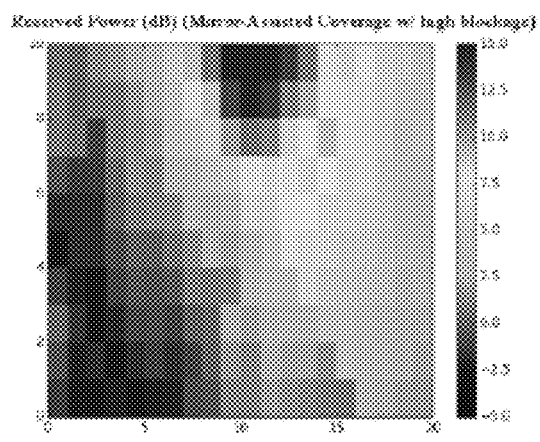

In both the indoor and outdoor environments, the signal will be blocked by objects, e.g. furniture in an indoor environment or buildings and vehicles in an outdoor environment. Using simple regression model analysis, this blockage can be modelled by calculating the probability of line of sight. In the examples given, the indoor scenario is modelled using an office-like environment which includes open plan office with cubical area, closed plan office with corridor and meeting room and also a hybrid office with both open and closed areas. The outdoor scenario is modelled based on a 3GPP 3D model for an urban scenario having buildings. Areas having medium and high blockage densities are modelled and are given in the table below:

FIGS. 6c and 6d compare the power received at each tile in the indoor environment for the "mirror-assisted coverage" where this is medium and high blockage density respectively. In both situations, more power is still recovered in each tile than in the "static coverage" environment of FIG. 6a. The performance is slightly decreased if there is high blockage density compared to medium blockage density. FIGS. 7c and 7d compare the power received at each tile in the outdoor environment for the "mirror-assisted coverage" where this is medium and high blockage density respectively. Similar to the indoor case, the mirror-assisted coverage leads to higher power for each tile even when there is a level of blockage. This is because the signals are reflected through neighbouring mirrors to improve the performance for medium and high density blockages when compared to the static coverage.

The blockage analysis is crucial for the outdoor case due to large objects (trees, lamp posts) and mobile objects (vehicles) within the environment that can lead to a high amount of scattering when the signals are reflected. At the same time, the outdoor case also has variations in the amount of molecular vapour that affects the signal absorption with 10% of water vapour. Therefore, the dynamic movement of the mirrors is very important to enable the signals to bounce around the high blockage areas to reach the receivers.

Given that in real-life situations, there are likely to be blockages another model for probability of line of sight is developed below. This model could be used as part of the method of FIG. 3a. Consider an area of X and Y dimensions with n mirrors spread across the borders of the borders of the space. A uniform distribution is used to position the mirrors in the space. This allows us to determine the location of the mirrors as in step S102 in FIG. 3a.

| | Medium Blockage Density | High Blockage Density |
|---|---|---|
| Indoor | $plos(d) = \begin{cases} 1 & \text{if } d <= 1.2 \\ \exp-\frac{d-1.2}{4.7} & \text{if } 1.2 < d \le 6.5 \\ \exp-\frac{d-6.5}{32.6}*0.32 & \text{if } d > 6.5 \end{cases}$ | $plos(d) = \begin{cases} 1 & \text{if } d <= 1.2 \\ \exp-\frac{d-1.2}{2.35} & \text{if } 1.2 < d \le 6.5 \\ \exp-\frac{d-6.5}{16.3}*0.32 & \text{if } d > 6.5 \end{cases}$ |
| Outdoor | $plos(d) = \begin{cases} 1 & \text{if } d <= 1.2 \\ \exp-\frac{d-1.2}{40} & \text{if } 1.2 < d \le 6.5 \\ \exp-\frac{d-6.5}{82.5} & \text{if } d > 6.5 \end{cases}$ | $plos(d) = \begin{cases} 1 & \text{if } d <= 1.2 \\ \exp-\frac{d-1.2}{80} & \text{if } 1.2 < d \le 6.5 \\ \exp-\frac{d-6.5}{165}*0.32 & \text{if } d > 6.5 \end{cases}$ |

The mirrors are m=[$m_x$, $m_y$], with $m_x \in (1, X-1)$ and $m_y \in (0, Y)$. The following can be considered as the matrix of mirrors and their positioning:

$$M = \begin{bmatrix} m^{(1)} \\ m^{(2)} \\ \vdots \\ m^{(n)} \end{bmatrix}$$

The probability of a single link line of sight for a transmitter ($T_x=[T_{xx}, T_{xy}]$), a receiver ($R_x=[R_{xx}, R_{xy}]$) and a single mirror $m^{(i)}$ is represented as $$P_{losM}(Tx,Rx,i) = \int_{m_x}^{m'_x} P_{los}(d(T_x, m^{(i)})) dx \times \int_{m_x}^{m'_x} P_{los}(d(m^{(i)}, R_x)) dx$$

in which $m'_x$ is the final position of the mirrors with length $L = m'_x - m_x$.

Therefore the total probability of line of sight ($TP_{los}$) is achieved by $$TP_{los} = \left( P_{los}(Tx, Rx) + \sum_{i=1}^{n} P_{losM}(Tx, Rx, i) \right) \times \frac{1}{n+1}$$

The total probability of line of sight can be used as part of the calculation of the topological coverage in step S108 of FIG. 3a.

Figure 8A:
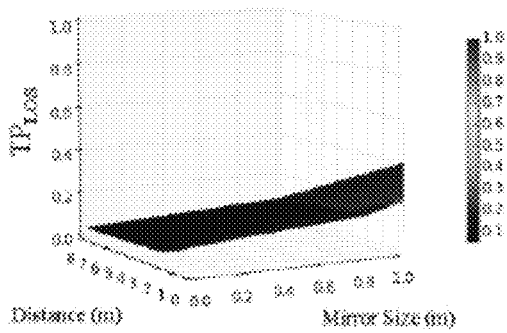
Figure 8B:
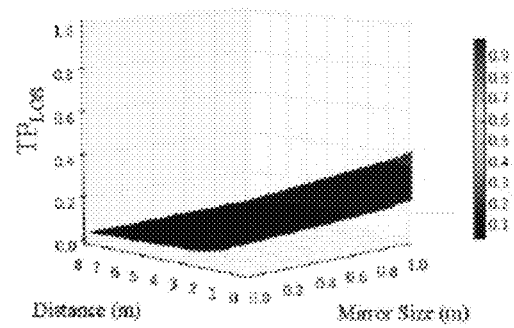

As shown in the Figures above, received power decreased with distance from the transmitter. FIG. 4b above showed communication between two users and this scenario is used for the analysis of distance. The transmitter is placed in the centre of the area and the receiver between 0 and 9 m away. The impact of the size of the mirror is also investigated with the mirror ranging from 0 to 1 m for the indoor environment and 0 to 5 m for outdoor environment. The mirrors are square for simplicity of the calculation. FIGS. 8a and 8b show the variation in total probability of line of sight as a function of both the communication distance and the mirror size for a medium blockage density and a high blockage density respectively in an indoor environment. The results show that the impact of the communication distance on probability of line of sight is minimal but that the probability of line of sight increases somewhat as the mirror size increases.

FIGS. 8c and 8d show the variation in total probability of line of sight as a function of both the communication distance and the mirror size for a medium blockage density and a high blockage density respectively in an outdoor environment. As with the indoor environment, the impact of the communication distance on probability of line of sight is minimal but this time there is a significant increase as the mirror size increases up to a saturation point of 2 m. From 2 m to 5 m there is no further increase in probability of line of sight. The greater impact in the outdoor environment is likely to be caused by the power of the signal meaning that there are more reflections in the environment.

These results show that better performance may be achieved if the size of the mirrors is selected to be proportional to the size of the coverage area (e.g. room for an indoor environment) and if the size of the mirrors is selected to be proportional to the power of the emitted signals.

As set out in FIG. 3a, one step in the method is to determine the desired coverage. We have discussed that it may be useful to co-ordinate the mirrors so that the mirrors reflect the signal to a particular tile within the area. The co-ordination could be expressed as the percentage of the total number of mirrors that are synchronised to reflect to a particular tile. FIGS. 9a and 9b show the relationship of mirror coordination at levels of 0%, 25%, 50% and 100% on received power for low, medium and high frequencies (0.3 THz, 2 THz, 4 THz) and for low, medium and high levels of blockage. FIG. 9a shows the relationship in indoor environment and for each frequency value, the improved coordination of the mirrors does not significantly improve the received power. Similarly, the increase in blockage densities does not significantly affect the performance even when then is increased mirror coordination. By contrast, in FIG. 9b which shows the relationship in the outdoor environment, the improved coordination of the mirrors does result in an improvement to the received power even when the quantity of blockage increases. The reason for the positive impact is due to the longer communication distances where the mirrors have an impact on longer range of directional angles and therefore can achieve better coverage areas. This helps to improve the received power performance in specific tile spots in the area.

FIGS. 10a to 12b show the improvement in capacity when using adaptive coverage. Both the power and noise p.s.d. are kept constant in the following analysis. In order to evaluate the capacity based on the ray-tracing algorithm, we use a wideband window model dividing the terahertz-band into sub-band channels. This is necessary due to the inherent frequency-selective characteristic of the terahertz channel. A number of i sub-band channels is selected with a $\Delta f$ width each. The resulting channel capacity is represented as:

$$C(d) = \sum_i \Delta f \log_2 \left[ 1 + \frac{\alpha(f, r)^{-1} S_i}{N_0} \right],$$

Figure 10A:
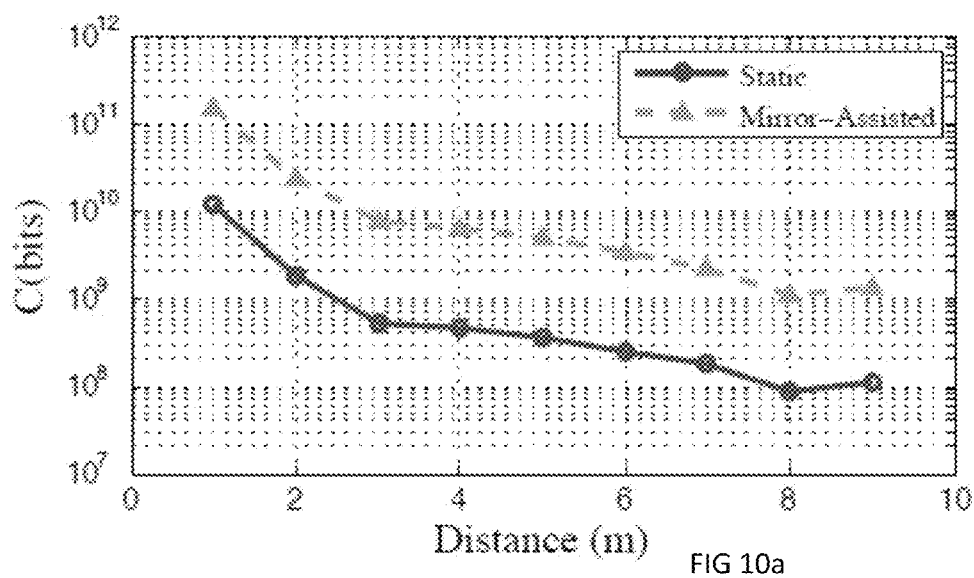
FIGS. 10a and 10b are graphs showing the variation in capacity as a function of distance and frequency respectively for a conventional communication system and the described communication system.

FIG. 10a illustrates the capacity as a function of distance for a 10×10 m area with 10×10 tiles with a frequency of transmission of 0.3 THz and $\Delta f$ of 10 THz. Terahertz-band communication performance is favourable for short-range distances and decreases exponentially as the distance is increased. However, as illustrated in FIG. 10a, the mirror-assisted coverage can improve the overall capacity by nearly 10 times compared to the static case.

Figure 10B:
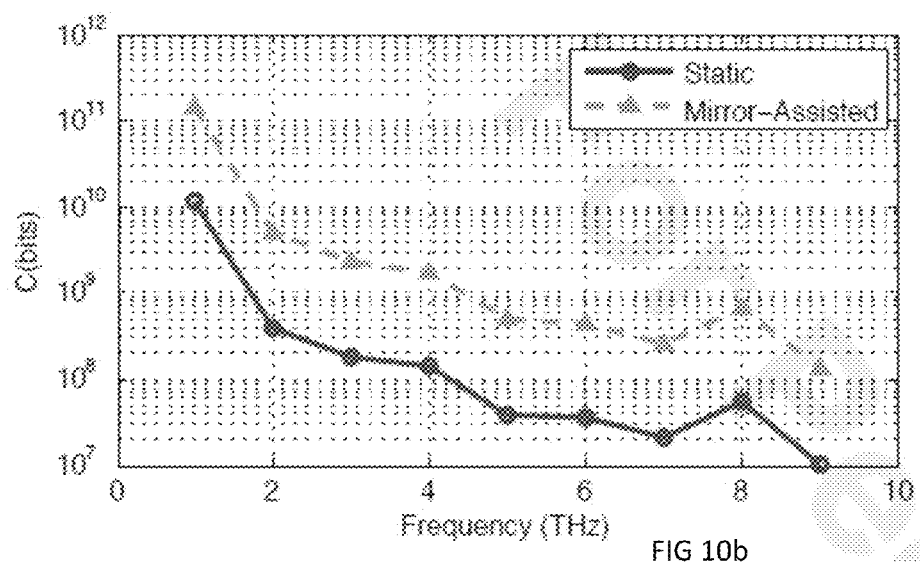

Similar to the distance variation, the variations in the frequency also affect the capacity. FIG. 10b illustrates the capacity as a function of frequency for a 5×5 m area with 5×5 tiles with a distance between the transmitter and receiver of 1 m and $\Delta f$ of 1 THz. For both the static and mirror-assisted coverage, the higher the frequency, the signal is more unstable and more likely to be affected by the quantity of molecular vapour within the air, thus leading to reduced capacity. However, there is a small increase in capacity at 8 THz which is due to the frequency selective characteristics of high terahertz frequency that are affected from molecular absorption. Across all frequencies, the mirror-assisted coverage can improve the overall capacity by nearly 10 times compared to the static case.

Figure 11A:
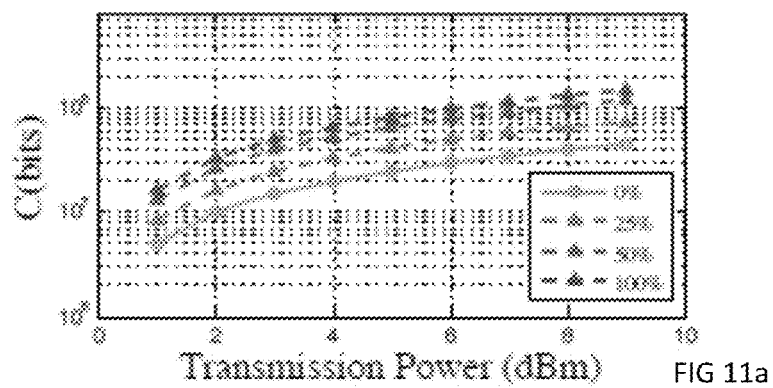
FIGS. 11a and 11b are graphs showing the relationship between capacity and transmission power for different coordination of mirrors in indoor environments having medium and high blockages respectively.
Figure 11B:
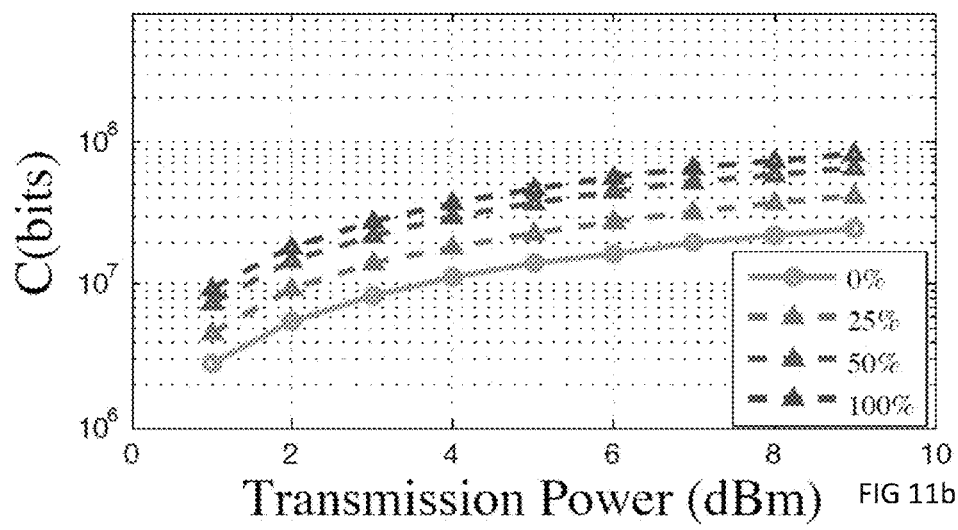
Figure 12A:
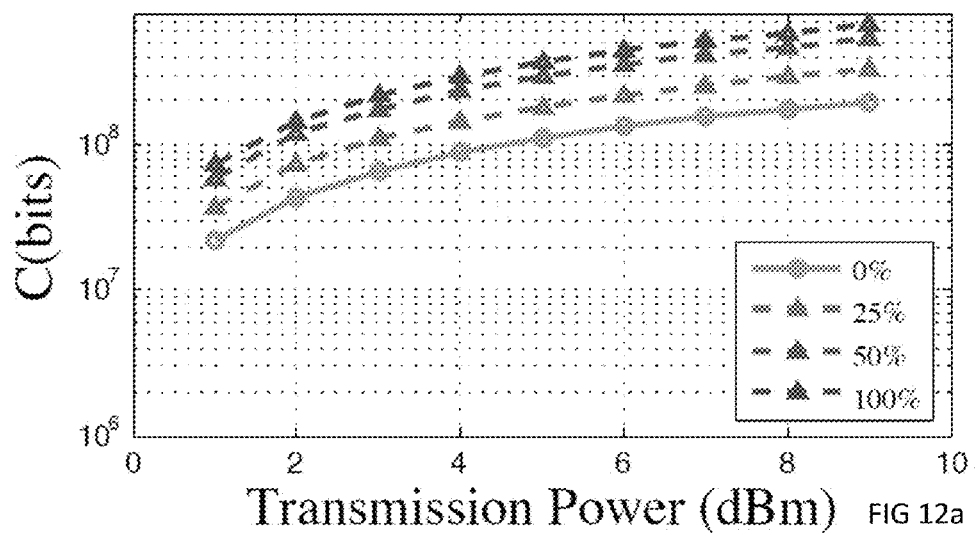
FIGS. 12a and 12b are graphs showing the relationship between capacity and transmission power for different coordination of mirrors in outdoor environments having medium and high blockages respectively.
Figure 12B:
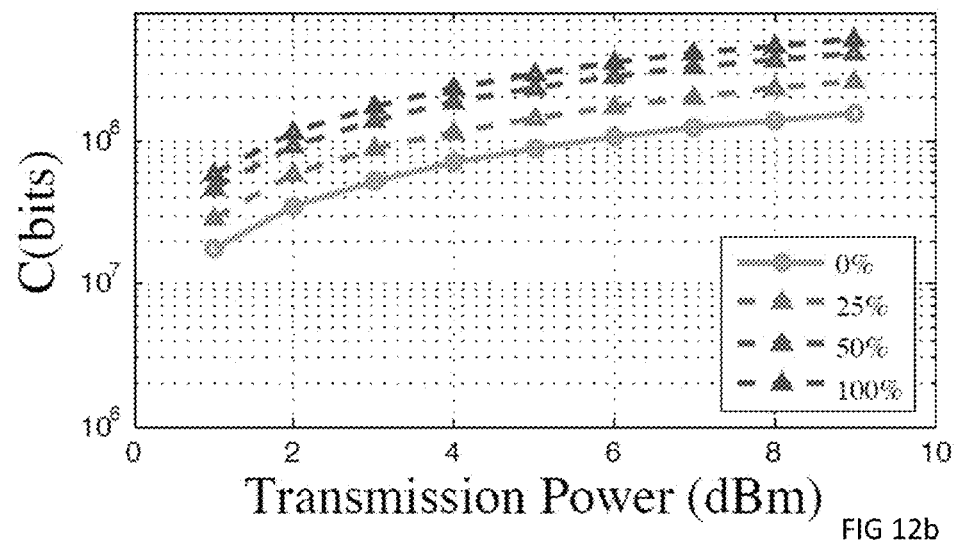

FIGS. 11a to 12b present the capacity results as a function of transmission power for each of the levels of mirror coordination (0%, 25%, 50% and 100%). FIGS. 11a and 11b show the indoor environment with medium and high blockage density respectively. FIGS. 12a and 12b show the indoor environment with medium and high blockage density respectively. For all the results, the transmission power has a linear dependency with capacity. Increasing the transmission power is highly beneficial to the capacity, although this comes at a cost of higher power. Due to the density of the blockage, the capacity decreases for higher blockage density. However, for both densities and both environments, increased coordination in the mirrors results in increased performance. The outdoor environment has higher capacity than the indoor environment due to the antenna gain for both the receiver and the transmitter. The results can be correlated with those shown in FIGS. 9a and 9b.

Figure 13A:
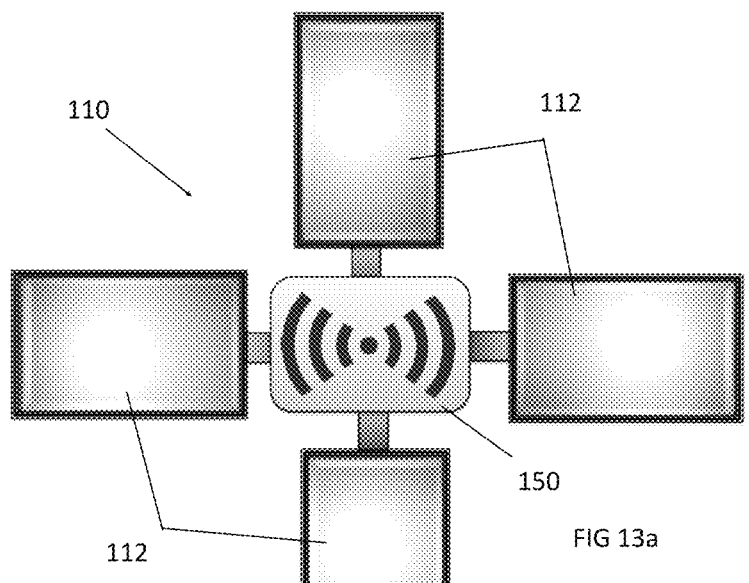
FIGS. 13a and 13b show alternative configurations of the antennas each with a different number of mirrors.
Figure 13B:
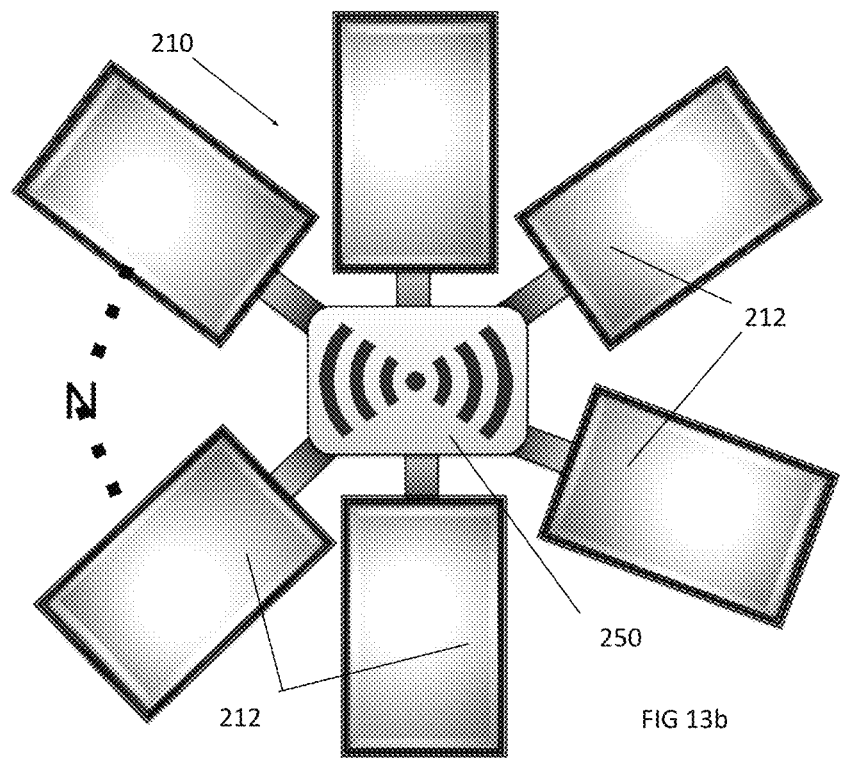

The number, size and shape of mirrors can be optimally calculated through simulation carried out based on the theoretical modelling described above. For example, in FIG. 13a, an example antenna structure 110 comprises an antenna 150 and four mirrors 112. As in FIG. 2a, the antenna 150 may be a patch terahertz antenna. The four mirrors 112 are all equally sized and are equally radially spaced around the antenna 150. FIG. 13b shows an example antenna structure 210 comprising an antenna 250 and multiple mirrors 212. There are N equally sized mirrors which are equally radially spaced around the antenna 250.

Figure 14A:
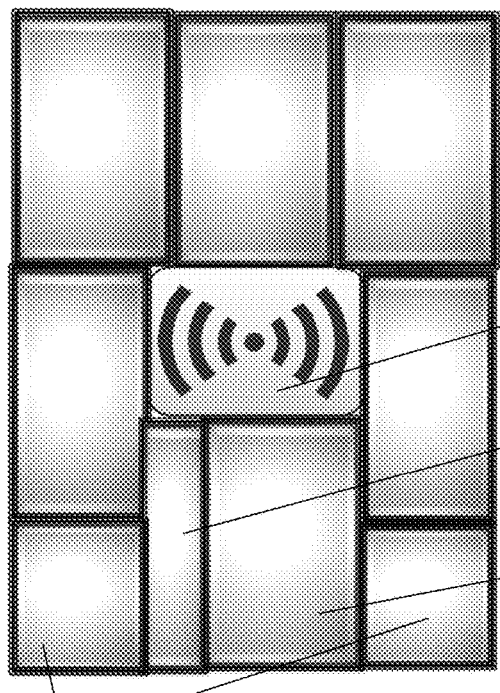
FIGS. 14a and 14b show a front and rear view of an alternative configuration.
Figure 14B:
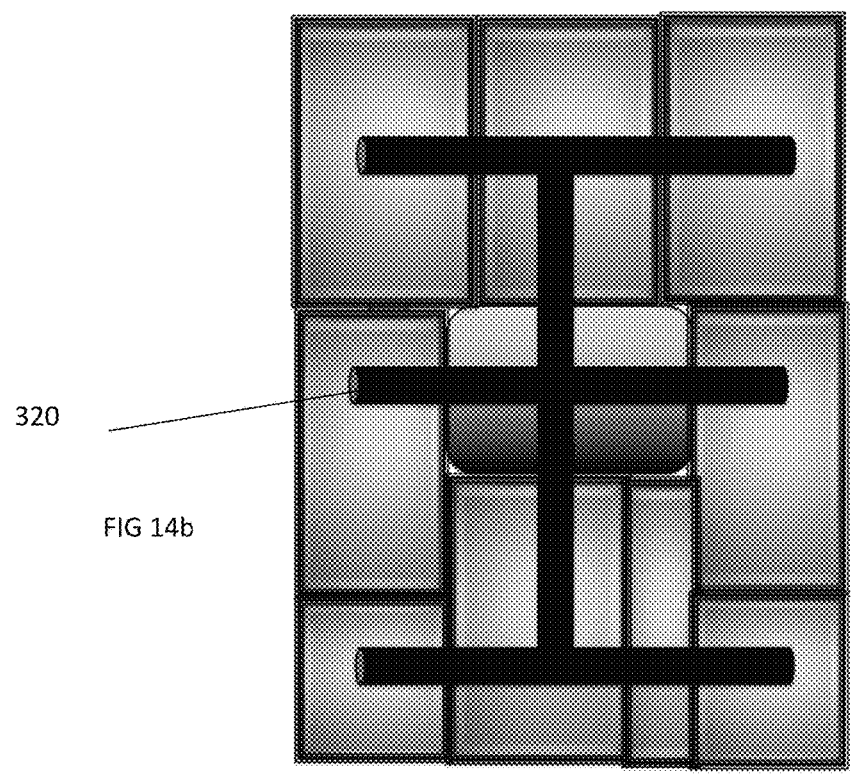

FIGS. 14a and 14b show an alternative arrangement of mirrors around a centrally mounted antenna 350. In this arrangement, there are multiple different sized mirrors 312a, 312b, 312c arranged to form a rectangular array around the antenna 350. The mirrors are adjacent one another. The array comprises relatively large rectangular mirrors 312a as well as relatively small (or thin) mirrors 312c together with generally square mirrors 312b. As shown in FIG. 14b which shows the rear of the array, the mirrors and antenna are support on a frame 320.

This will represent flexible set up of number of mirrors in one antenna configuration as well as different approaches. This will give this solution flexibility in terms of designing the network and its mirrors based on the demand found on an indoor or outdoor setting. This is represented in FIGS. 13a, 13b, 14a and 14b, where these aspects are visually described.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of controlling a terahertz-band communication cell having a coverage area and comprising a plurality of antenna structures each having an antenna configured to transmit a signal in the terahertz-band and at least one mirror which is moveable to reflect a terahertz-band signal from a different antenna in the plurality of antenna structures, the method comprising:
dividing the coverage area into an array of tiles;
determining the location of each of the plurality of antenna structures within the coverage area;
determining the location of a transmitter within the coverage area;
calculating the coverage obtained for at least one target tile within the coverage area using the locations of the transmitter and each of the plurality of antenna structures;
determining a desired coverage for at least one target tile within the coverage area;
determining whether the calculated coverage matches the desired coverage and
if there is no match, adjusting at least one mirror of at least one antenna structure to provide the desired coverage.

2. The method of claim 1, further comprising calculating the coverage by determining for the at least one target tile at least one of the following properties: capacity, received power, path loss from the transmitter to the target tile and probability of line of sight between the transmitter and the target tile.

3. The method of claim 1, wherein the coverage is calculated using a technique selected from the group consisting of a topographical model, a ray-tracing algorithm, 3-dimensional clipping elimination, hidden surface elimination and a machine learning engine.

4. The method of claim 1, further comprising determining the desired coverage based on historical data patterns for users within the coverage area.

5. The method of claim 4, further comprising determining the desired coverage by predicting which specific locations within the coverage area have high density of users at particular times.

6. The method of claim 1, further comprising determining the desired coverage in real-time for a particular user at the specific location.

7. The method of claim 1, wherein adjusting the at least one mirror comprises moving the at least one mirror to reflect the terahertz-band signal from a neighbouring antenna.

8. The method of claim 1, wherein adjusting the at least one mirror comprises changing the curvature of the at least one mirror.

9. The method of claim 1, wherein adjusting the at least one mirror comprises providing a virtual line of sight between the transmitter and the at least one target tile.

10. The method of claim 1, wherein adjusting the at least one mirror comprises determining, using a machine learning engine, an adjustment to be made to a mirror of an antenna structure and forwarding said determined adjustment to the antenna structure.

11. The method of claim 1, further comprising determining which of the plurality of antenna structures is currently providing a signal to a user and for other antenna structures within the plurality of antenna structures predicting the probability that each other antenna structure will be the next antenna structure to provide the signal to the user.

12. The method of claim 11, further comprising determining that the probability for a next antenna structure is above a first threshold value and synchronising the signal between the antenna structure currently providing the signal to the user and the next antenna structure.

13. The method of claim 11, further comprising determining that the probability for a next antenna structure is above a second threshold value which is higher than the first threshold value and transferring transmission of the signal from the antenna structure currently providing the signal to the user to the next antenna structure.

14. A non-transitory computer readable storage medium storing instructions, which when executed by a processor, cause the processor to perform steps to control a terahertz-band communication cell having a coverage area and comprising a plurality of antenna structures each having an antenna configured to transmit a signal in the terahertz-band and at least one mirror which is moveable to reflect a terahertz-band signal from a different antenna in the plurality of antenna structures, the steps comprising:
- dividing the coverage area into an array of tiles;
- determining the location of each of the plurality of antenna structures within the coverage area;
- determining the location of a transmitter within the coverage area;
- calculating the coverage obtained for at least one target tile within the coverage area using the locations of the transmitter and each of the plurality of antenna structures;
- determining a desired coverage for at least one target tile within the coverage area;
- determining whether the calculated coverage matches the desired coverage and
- if there is no match, adjusting at least one mirror of at least one antenna structure to provide the desired coverage.

* * * * *